United States Patent

Simon et al.

[11] Patent Number: 6,125,335
[45] Date of Patent: Sep. 26, 2000

[54] WIDE FIELD CALIBRATION OF A MULTI-SENSOR ARRAY

[75] Inventors: William E. Simon, Satellite Beach; Jie Shi; Craig A. Iannello, both of Melbourne, all of Fla.

[73] Assignee: Sun Nuclear Corporation, Melbourne, Fla.

[21] Appl. No.: 09/058,639

[22] Filed: Apr. 10, 1998

[51] Int. Cl.[7] .................................................. H01L 21/00
[52] U.S. Cl. ......................... 702/85; 378/207; 250/252.1
[58] Field of Search .................. 702/85, 104; 250/252.1, 250/341.5, 370.07, 370.1; 436/58, 902; 378/164, 165, 207

[56] References Cited

U.S. PATENT DOCUMENTS

| | | | |
|---|---|---|---|
| 5,027,818 | 7/1991 | Bova et al. | 128/653 R |
| 5,256,879 | 10/1993 | McNulty et al. | 250/370.06 |
| 5,302,824 | 4/1994 | Prager | 250/252.1 |
| 5,430,785 | 7/1995 | Pfoh et al. | 378/19 |
| 5,473,663 | 12/1995 | Hsieh | 378/207 |
| 5,506,880 | 4/1996 | Scardino et al. | 378/98.2 |
| 5,511,549 | 4/1996 | Legg et al. | 128/653.1 |
| 5,604,347 | 2/1997 | Petrick et al. | 250/252.1 |
| 5,621,214 | 4/1997 | Sofield | 250/375 |
| 5,627,367 | 5/1997 | Sofield | 250/252.1 |
| 5,771,272 | 6/1998 | Berger et al. | 378/207 |
| 5,789,622 | 8/1998 | Quon et al. | 364/571.02 |
| 5,866,900 | 2/1999 | Jacobson et al. | 250/252.1 |
| 6,008,494 | 12/1999 | Heukenfeldt Jansen | 250/363.09 |

*Primary Examiner*—Patrick Assouad
*Attorney, Agent, or Firm*—Brian S. Steinberger; Law Offices of Brian S. Steinberger

[57] ABSTRACT

A method has been developed to calibrate the relative radiation response of sensors in an array by substitutional analysis of the sensor outputs caused by a radiation field wider than the array. The array is positioned in the wide field in such a way that the sensor positions in the array are exchanged once by translation in order to calculate ratios of neighboring detector sensitivity and once by rotation in order to calculate ratios of mirror detector sensitivities. There is no dependence on dose reproducibility, field flatness or symmetry. The method requires that the profile shape produced by the machine during each measurement be reproducible and that the array movements do not affect the scattering conditions.

16 Claims, 12 Drawing Sheets

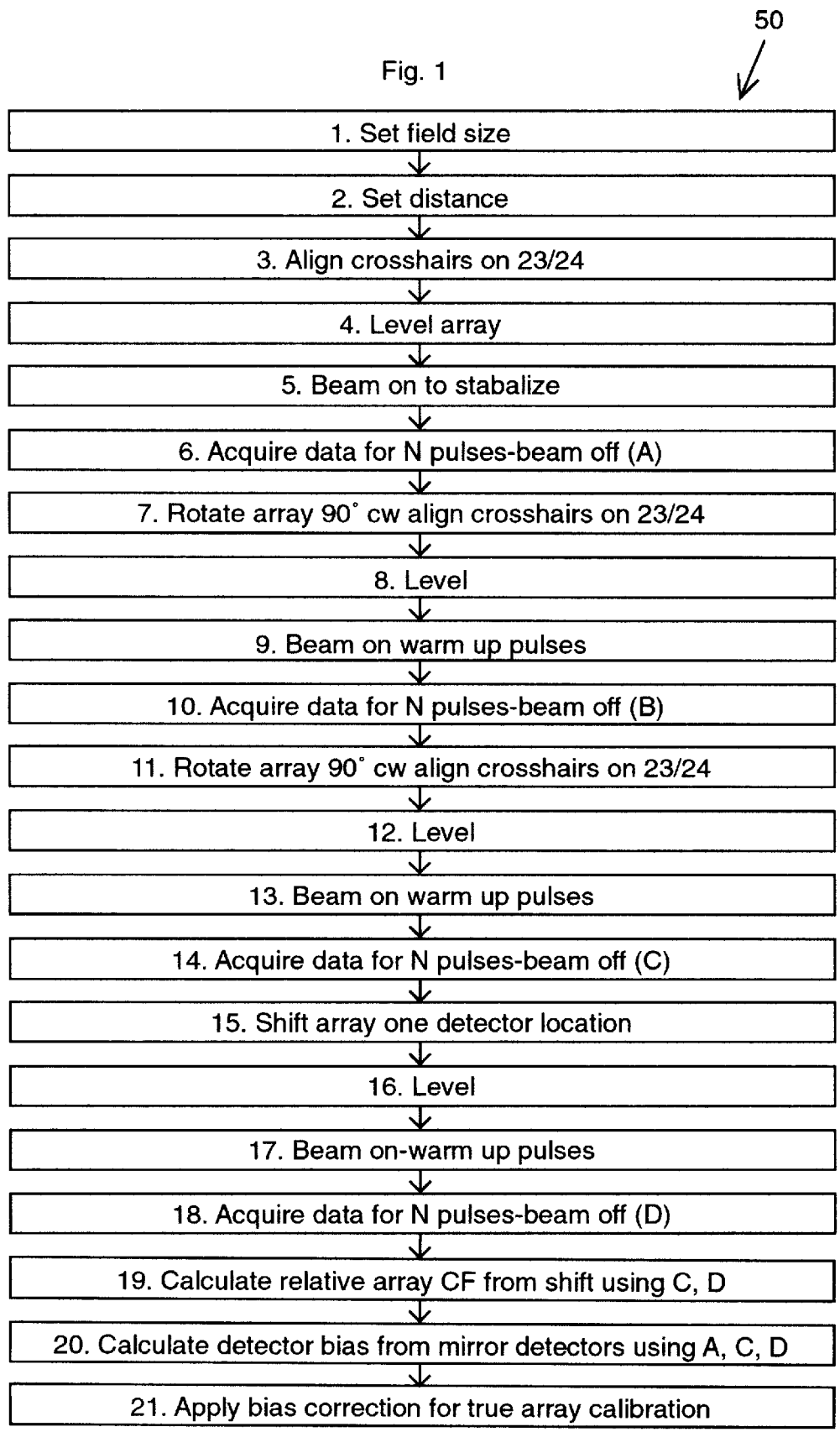

Fig. 1

1. Set field size
2. Set distance
3. Align crosshairs on 23/24
4. Level array
5. Beam on to stabalize
6. Acquire data for N pulses-beam off (A)
7. Rotate array 90° cw align crosshairs on 23/24
8. Level
9. Beam on warm up pulses
10. Acquire data for N pulses-beam off (B)
11. Rotate array 90° cw align crosshairs on 23/24
12. Level
13. Beam on warm up pulses
14. Acquire data for N pulses-beam off (C)
15. Shift array one detector location
16. Level
17. Beam on-warm up pulses
18. Acquire data for N pulses-beam off (D)
19. Calculate relative array CF from shift using C, D
20. Calculate detector bias from mirror detectors using A, C, D
21. Apply bias correction for true array calibration

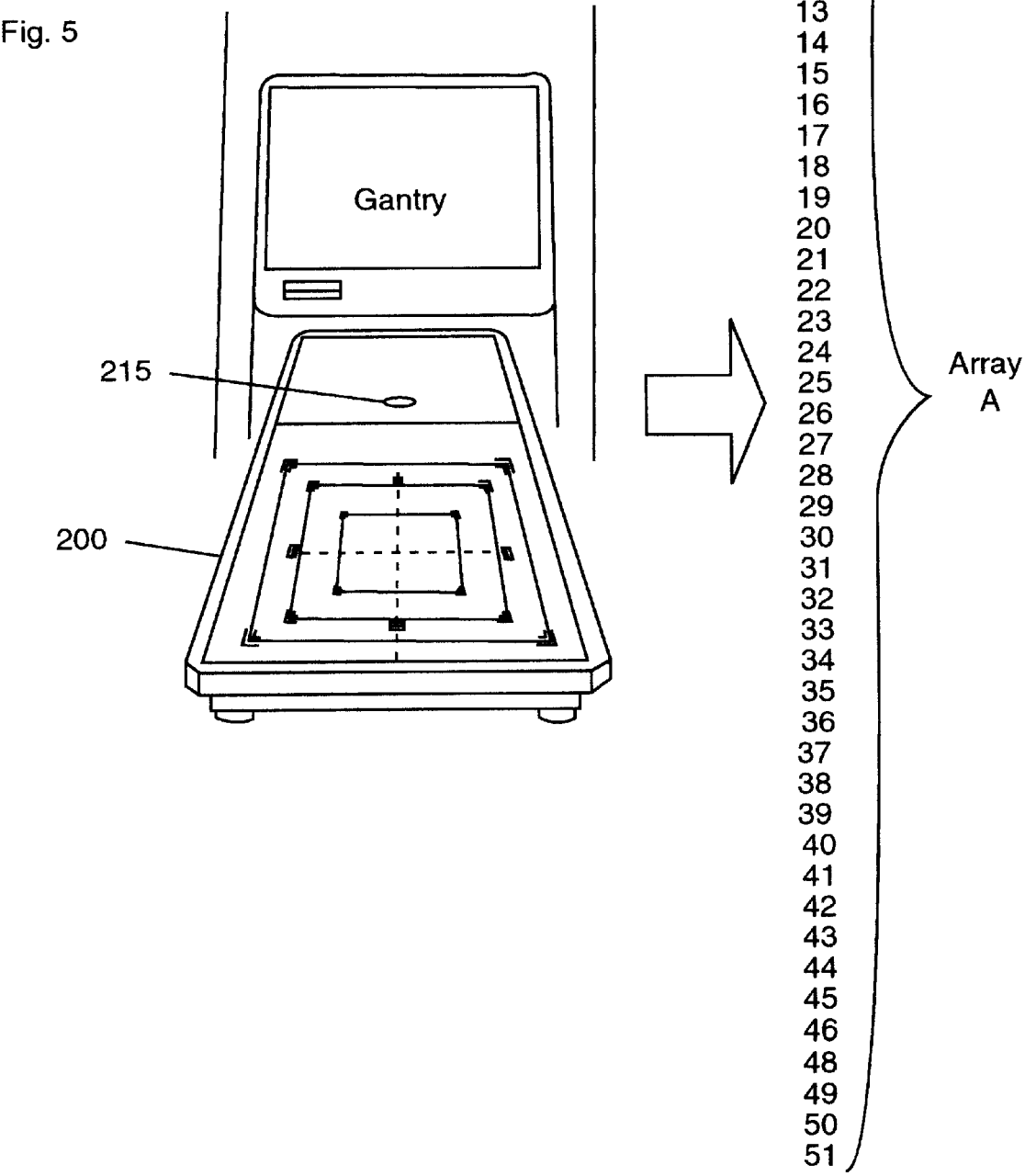

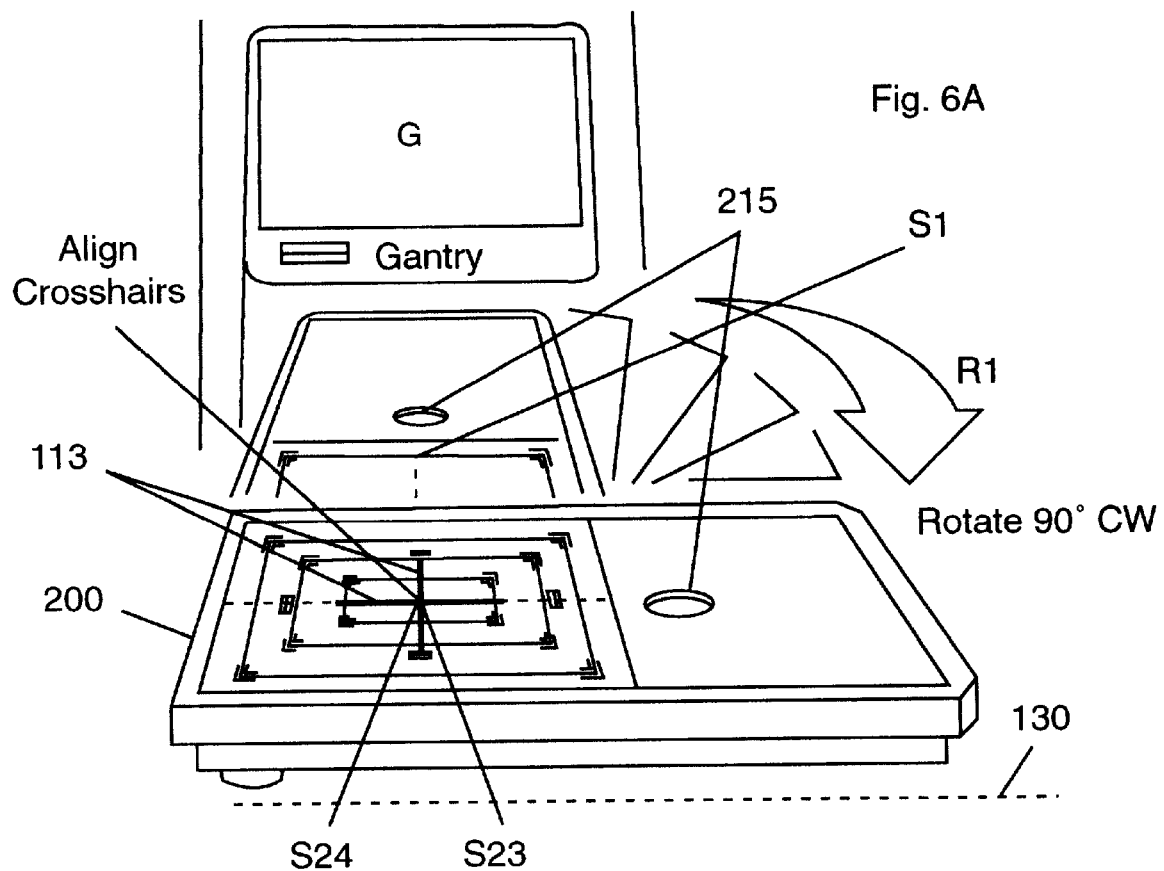

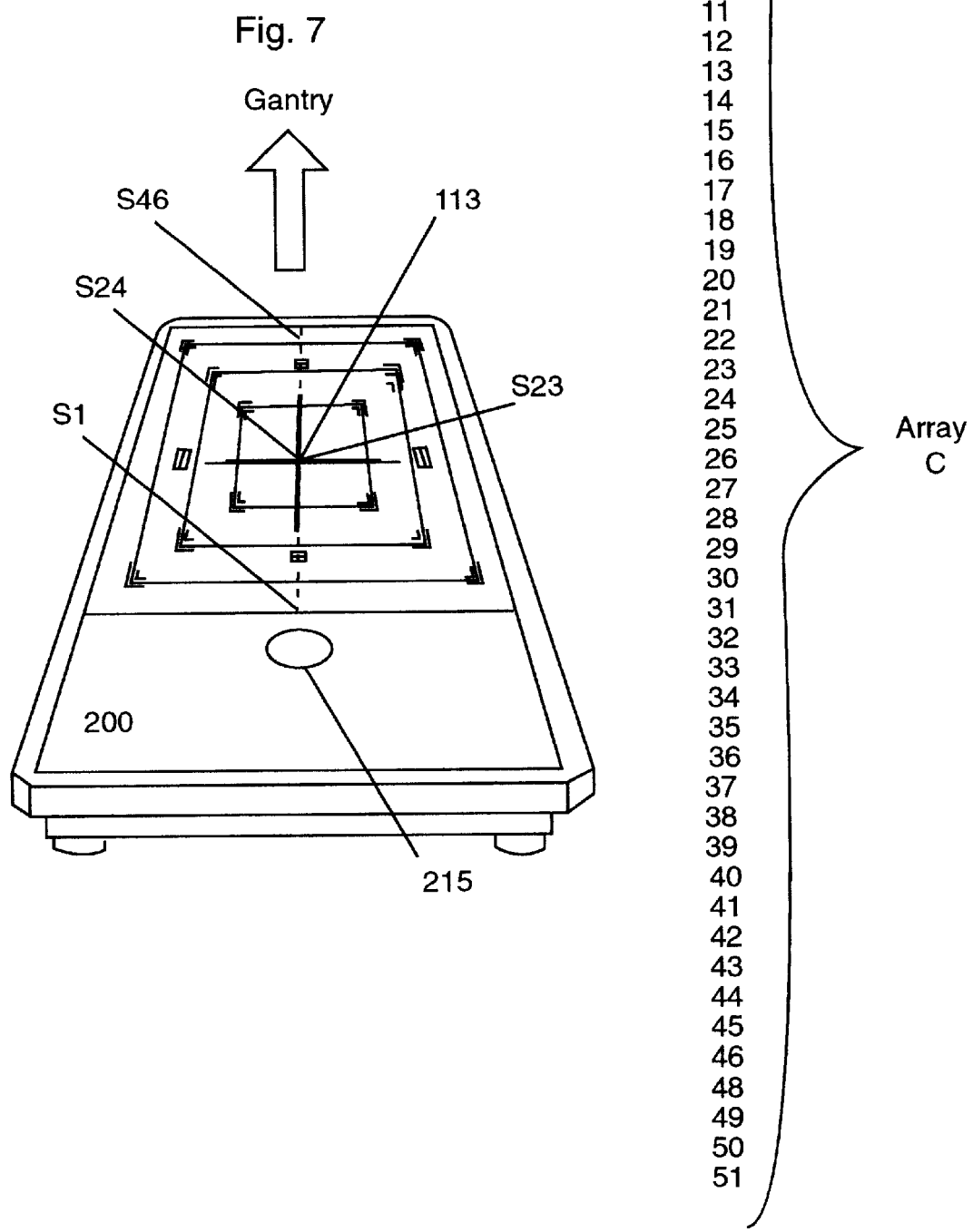

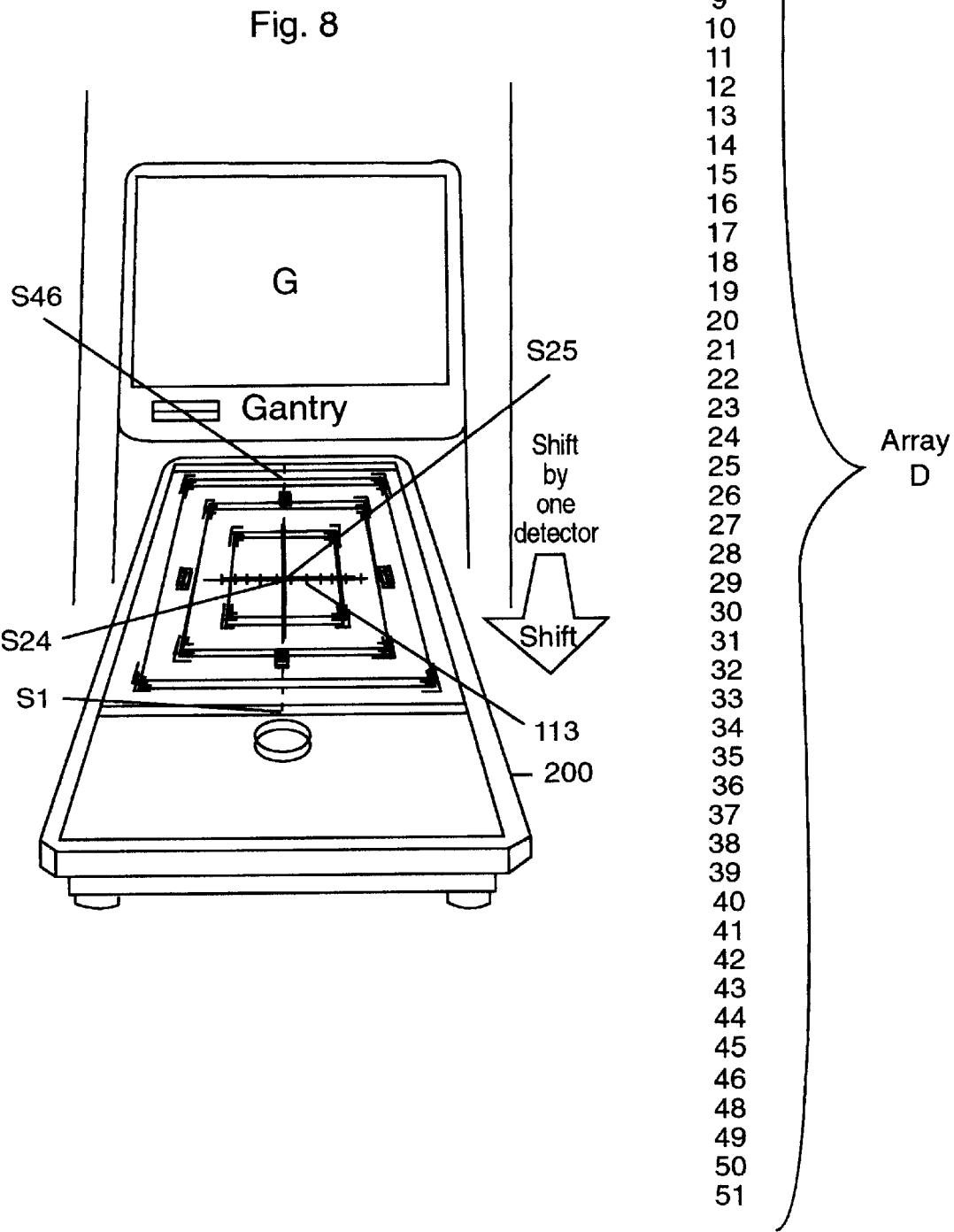

Fig. 9

An intermediate expression for the nth detector's calibration factor is:

$$cf'_n = \left[\prod_{i=1}^{n-1} \frac{C_i}{D_{i+1}}\right]$$

where $C_i$ and $D_{i+1}$ represents array elements,
   n represents any detector number 2 through E,
   the end detector of the linear array. For the Profiler, E = 46.

Fig. 10

The bias, $D_{dc} S_{dc}$, is calculated from the following expression found from the relative detector sensitivities resulting from detector pairs whose positions were exchanged by rotation. $D_{dc}$ is the ratio of the change in dose from set C to D. $S_{dc}$ is the detector group's sensitivity change from set C to D.

$$\ln\left(D_{dc} \cdot S_{dc}\right)_n = \frac{1}{2n-(E+1)} \cdot \left[\frac{1}{2} \ln\left(\frac{C_{E-n+1}}{C_n} \cdot \frac{A_{E-n+1}}{A_n}\right) - \sum_{i=E-n+1}^{n-1} \ln\frac{C_i}{D_{i+1}}\right]$$

where A, C, and D represent data arrays,
   n represents a detector pair numbered from:
     n = [E/2]+1 → E: when E is even, as is the case for the Profiler,
     n = [(E+1)/2]+1 → E: when E is odd,
   E is the end detector of the linear array. For the Profiler, E = 46.

Fig. 11

The general expression for the nth detector's calibration factor is:

$$cf_1 = 1.000 \text{ by definition}$$

$$cf_n = cf'_n \cdot e^{(n-1)\cdot \overline{\ln\left(D_{dc} \cdot S_{dc}\right)}}$$

where n is for all other detectors in the linear array (2 through E)

The average of ln $(D_{dc} S_{dc})$, for all mirror by rotation pairs, is found from:

$$\overline{\ln\left(D_{dc} \cdot S_{dc}\right)} = \frac{1}{E-p+1} \cdot \sum_{i=p}^{E} \ln\left(D_{dc} \cdot S_{dc}\right)_i$$

where p = [E/2]+1 when E is even,
        p = [(E+1)/2]+1 when E is odd,
        E = End detector number in the linear array.

WIDE FIELD CALIBRATION OF A MULTI-SENSOR ARRAY

This invention relates to calibration techniques, and in particular to a wide field calibration method for calibrating the radiation sensor detectors of a multi-sensor detector array.

BACKGROUND AND PRIOR ART

Radiation detector arrays are used to measure the radiation intensity distribution exiting the beam port of a linear accelerator. Such beams generally consist of x-rays or electrons and are used, among other applications, to treat cancer by delivering a lethal dose of ionizing radiation to the tumor. During treatment, the beam port is adjusted to shape the beam to the tumor size. Therefore, precise data on the beam profile is necessary for proper dose control to the tumor. For example, the Profiler, Model 1170 by Sun Nuclear Corp. of Melbourne, Fla., assignee of the subject invention, uses an array of diodes to accomplish a real-time graphic image of the radiation output of a medical accelerator device. The Profiler evaluates the beam flatness, symmetry, field size, and shape.

The linear accelerator is basically an x-ray machine which can produce very high-energy radiation beams and rotates on a gantry for precise delivery to the patient lying on a table. At the heart of the accelerator is an electron gun, which injects a pulse of electrons into an evacuated accelerating tube. The tube is divided into stages through which the electrons are attracted because of a potential difference across each stage. At the end of the tube, the electrons may have been accelerated up to 18 million volts or more. The beam electrons are steered to exit through a thin port as an electron beamor strike a target to produce an x-rays beam. Many factors affect the profile of radiation, including the steering mechanisms, the accelerating voltage, the exit targets, the collimators which shape the beam, and possibly tube sag caused by a change in the gantry angle.

Manufacturers of such accelerators include Varian Corporation in Palo Alto, Calif., who make the Clinac 2100C and Clinac 2500 which produce 2 x-ray beams and several electron beams; and Philips in England, who make the SL25, also a multi energy machine.

When the response of a detector array is tabulated or plotted in a profile of intensity vs detector location, there will be variations in such a profile due to differences in radiation intensity at each location and differences in detector sensitivity at each location. Array calibration is required in order to plot only radiation intensity changes. Calibration of the detector array involves the determination of the relative sensitivity differences between individual detectors in the array. Application of the calibration factors to the measured array response to radiation will result in a profile of the relative radiation intensity at the individual detector locations.

The need for re-calibration will also be determined by the detector type, the beams measured, the frequency of use, and detector service. For example, the sensitivity of diode detectors decreases with large radiation doses. Both ion chamber and diode detectors exhibit an energy response in their sensitivity, therefore calibration at each beam energy will result in improved measurements. The components used to measure any detector output also may change with radiation doses. This will, in effect, change the apparent detector sensitivity which can be corrected with re-calibration. Any time a detector or its measurement electronics is serviced or replaced, the array should be re-calibrated.

Various techniques known to the subject inventors calibrate multiple sensor arrays used on linear accelerators by positioning each detector on the central axis or by using a wide field to cover the array and assumptions are made about exposure reproducibility and or flatness and symmetry.

Wellhofer of Schwarzenbruck, Germany manufactures dosimetry equipment including water tanks which use a single detector that moves about the tank recording the dose in three dimensions, as well as a multi-detector ion chamber array(Model CA24) that simultaneously records the dose at each detector location. The multi-detector array can be calibrated by positioning the array sensors in positions previously measured by the moving single detector. Positioning is accomplished with stepper motors in the tank.

Scanditronix of Uppsala, Sweden manufactures dosimetry equipment including water tanks and multi-detector arrays. Two methods exist for calibrating the array. First, each detector is positioned on the central axis and given the same radiation dose. The second method is to perform the calibration in a wide field, making three measurements, with the center of the array positioned at −25, 0, +25 mm positions and the resulting measurements occur at overlapping positions. Positioning is accomplished with the stepper motors included with the water tank.

Schuster of Forchheim, Germany manufactures a multi-detector array with a central axis calibration procedure using a stepper motor table. Victoreen of Cleveland, Ohio, manufactures a multi-detector array that uses a calibration method which positions each detector at the central axis of the beam, where the calibration is made using a stepper table at the factory.

Various types of patents have also been granted for calibration of radiation type sensors. See U.S. Pat. No. 4,228,515 to Genna et al.; U.S. Pat. No. 4,654,796 to Takagi et al.; U.S. Pat. No. 4,872,188 to Lauro et al.; and U.S. Pat. No. 5,221,842 to Shepherd. These patents will be described below.

Genna ('515) describes the calibration of a detector array used for event position analysis in order to determine radiant emission trajectories emanating from a patient in nuclear medicine imaging. All detectors sample each origin position in order to determine their relative response to that origin, without moving the array. Takagi ('188) describes the calibration of a detector array used in x-ray tomography for the measurement of radiation transmission differences from one radiation exposure to the next, where a change occurred in the absorber. Lauro ('842) describes the calibration of detector arrays to compensate for spatial misalignment of corresponding detectors. The subject is imaging from radiation attenuation signals in the same plane. Shepard ('842) describes the calibration of a detector array which represents quality assurance testing of individual dosimeters. The method of Shepard ('842) assumes the radiation field is uniform at all detector locations which is an invalid assumption in the application of linear accelerator beams. The other prior art patents do not result in a calibration of the detector array for accelerator beams.

SUMMARY OF THE INVENTION

The first objective of the present invention is to provide a method of calibrating sensors within an array that measure radiation beams such as but not limited to photon beams, x-rays and electron beams.

The second object of this invention is to provide a method of calibrating an array of linear radiation detectors.

The third object of this invention is to provide a method of calibrating an array of two dimensional radiation detectors.

The novel calibration method results in a true measure of the relative sensitivity of all the sensors in the array. The relative sensitivity of each sensor, in the form of a calibration factor, can be applied to the measured output of the sensor array in order to correct for individual differences in the sensor and their circuit components. The method assumes a sensor arrangement with a repeating geometric pattern. The total array is irradiated and the recorded measurement is saved. The array is then spatially shifted by placing adjacent sensors in positions formerly occupied by neighboring sensors and another measurement is saved. The relative sensitivity between sensors can then be calculated by taking the ratio of their two successive measurements at the same spatial location. This ratio contains a bias, due to unknown changes between the two irradiations, which propagates through the entire array and may cause a significant error. The bias is corrected by rotating the array 180 degrees and calculating the absolute relative sensitivity between sensors with mirror symmetry. The benefit of such a calibration is that the sensors are calibrated in the region of the beam where they are used, which, in the off axis regions, may have a different radiation energy. It is also much faster than traditional single measurements on the central axis. The novel calibration method does not require the beam to have any special uniformity and can be performed on any beam. Calibration at specific beam energies improves the measurement precision when such beams are measured.

Further objects and advantages of this invention will be apparent from the following detailed description of a presently preferred embodiment, which is illustrated schematically in the accompanying drawings.

BRIEF DESCRIPTION OF THE FIGURES

FIG. 1 is a flow chart detailing the 21 method steps for performing the novel calibration invention on the Sun Nuclear Profiler detector array, model 1170.

FIG. 5 shows the beam profiler of FIG. 3A acquiring data from the detector array after the warm up period and saving the data into Array A.

FIG. 6A shows rotating the beam profiler array of FIG. 5 and aligning the center to the crosshair for the next calibration step.

FIG. 7 represents the beam profiler array of FIG. 6B rotated again in the direction of arrow R1 another ninety degrees and aligned as in FIG. 6A, leveled as in FIG. 3B, beam warmed up as in FIG. 4, and saving the data into Array C.

FIG. 8 shows the final acquisition data position of the detector array where it is shifted by one detector position, leveled as in FIG. 3B, beam warmed up as in FIG. 4, and saving data into Array D.

FIG. 9 shows the equation used to calculate the intermediate calibration factors.

FIG. 10 shows the equation used to calculate the correction to the bias (error) which is embedded in the intermediate calibration factors.

FIG. 11 shows the equation used to calculate the final calibration factor.

DESCRIPTION OF THE PREFERRED EMBODIMENT

Figure 2A:
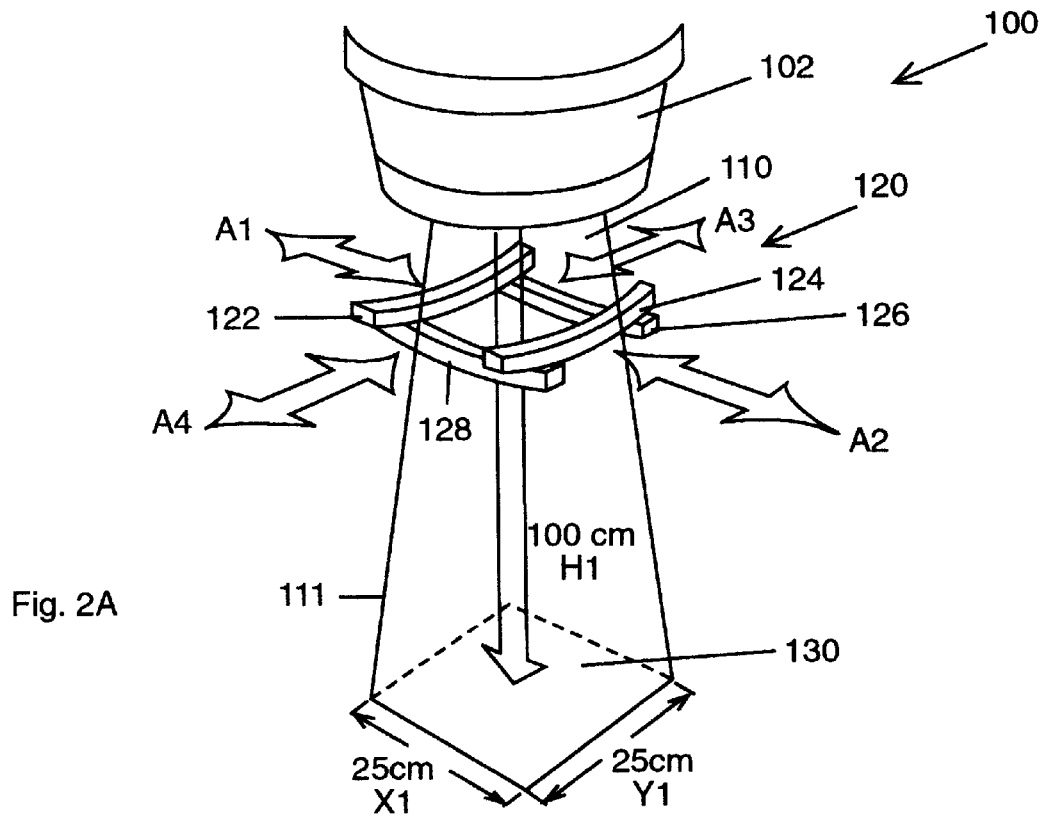
FIG. 2A is a perspective view of the beam field size being adjusted by the movable collimators of a typical radiotherapy machine.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Multi-detector arrays are used to determine the dose distribution across a field of radiation. Calibration values of such an array consist of sensitivity values for each detector which can be applied to the measured output of a detector in such a way that the corrected measurement of dose distribution is independent of the detector sensitivity. Sensitivity may not only include the actual radiation sensor response, but also the influences of components in the measurement electronics.

The dose distribution can be plotted in arbitrary units in order to determine the parameters of interest, such as flatness and symmetry. Therefore, the calibration values of the detector array need only be a table of relative sensitivity values, determined by some technique which makes the plotted distribution invariant with detector number.

Prior methods of calibration have used a narrow field and a device to move the detector array in steps such that each detector occupies the same position in the field while its response is measured. The narrow field keeps the scattered radiation to the calibration position constant as the array moves. A stationary reference detector is positioned in the field such that its measured value can be used to correct for radiation intensity changes which occurred during the course of detector measurements.

If the array detectors' response is energy dependent, then the calibration value is valid only at the beam energy used during calibration. Measurements of different beam energies can be corrected by calibrating at each beam energy. In addition, as the point of measurement moves away from the beam axis, there is a small change in beam energy and a change in the angle of incidence of the radiation to the detector. If the energy response is large or if there is a directional dependence, then the calibration will be valid only at the location in the field where the detector was calibrated. The severity of this limitation depends upon the magnitude of the energy response. Most, if not all, array detectors have some energy and directional dependence. This may then violate the invariance requirement.

The Preferred embodiment of the subject invention encompasses a linear array which can include off axis detectors positioned symmetrically from the array. However, the subject invention is applicable to other arrays such as but not limited to two dimensional arrays which have some repeating symmetry to the detector arrangement.

The linear array described in the preferred embodiment is positioned in the radiation field such that the field overlaps the end detectors. The following steps are conceptually arranged for descriptive purpose, their order is not important. Radiation is delivered to the array and the measurement of the detectors are saved in a data array [C]. The array is now moved laterally along the array axis such that the detectors now occupy positions in the fields formerly occupied by adjacent detectors. Another dose is delivered and the measurement is saved in a data array [D].

If the dose delivered is precisely the same for both [C] and [D], and the measurements have a very high precision, then the relative sensitivity of neighboring detectors can be calculated because they both occupied the same location in the field.

For example, the array was shifted for [D] and #2 (detector number 2 in the array) occupies #1's former position during [C]. Then the sensitivity of #2 to #1 is the ratio of 'D2'/'C1'. Likewise the sensitivity of #3 to #2 is the ratio of 'D3'/'C2', and the sensitivity of #3 to #1 is ('D3'/'C2')*('D2'/'C1'). In like manner, the entire array sensitivity can be calculated with respect to detector #1.

The benefit of such a calibration is that the measured values for each detector's calibration is taken at or near the field location where it will be used to measure the field distribution. Any change in energy or angle of incidence at adjacent regions in the field will be small which will minimize any error caused by an energy or directional response. Furthermore, the relative sensitivity between neighbors will be known to a higher precision because it is a simple ratio between two measured values, at the spatial location where they will be used. This will result in a higher precision in field profile measurement, which can reveal significant profile shapes otherwise obscured by measurement artifacts.

However, such a simple calibration is not practical without further measurements. With the calculation described above, any error in measurement precision, dose delivery, or minor sensitivity change in the array will propagate through the ratios and the end could have a significant error which could have significant effects on symmetry calculations. For example, a 0.1% error bias in the dose delivery will cause a 4.6% sensitivity error on the 46th detector. Or, if the measurement uses a rate mode with a precise time constant, then a shift in machine output (from dose per pulse) of 0.1% has the same impact.

The error bias between data sets [C] and [D] can be corrected by rotating the array 180 degrees from the orientation of data set [C] and making a third measurement, saving it as data array [A]. With data set [A], the relative sensitivity between the end detectors can now be calculated because they occupy each other's former positions. The relative sensitivity between all mirror detectors can be calculated. These true relative sensitivity values can then be used to determine a correction to account for the error bias with a precision limited only by the measurement precision between a detector pair.

There are five requirements between these data sets:
1. The movement of the detector array should not change the scatter conditions to the detector array.
2. The dose distribution profile from the machine should not change from one data set to the next, i.e., the profile shape must stay constant. It is allowed that the actual dose or dose rate change between data sets, these changes are compensated in the data analysis. However, if the energy of the beam itself changes during or between data sets, then the profile shape will probably be affected and invalidate the calibration process.
3. The relative sensitivity of the detectors all change the same amount. This statement is in recognition of the equilibration of a detector's response during radiation exposure. Typically changes in response are small (0.1%) and difficult to measure. Furthermore, the change may be due to the measurement electronics or a change in environmental conditions.
4. The field size must overlap the end detectors sufficiently to allow the end detectors to be irradiated without penumbra effects. Buildup plates over and around the detector array must be uniform and extend beyond the field size, otherwise movement may change the scatter beam. Note that the field size only pertains to the detectors to be calibrated. It is possible to calibrate a portion of the array as long as the field size overlaps the portion to be calibrated.
5. The field shape (i.e., dose distribution) can be irregular, however, high gradient changes in intensity will require higher precision in array positioning than for low gradient changes. Theoretically, it is possible to calibrate in a fixed wedge field. In fact, it would be desirable to calibrate in a fixed wedge field when measuring fixed wedge beams in order to properly compensate for energy changes due to beam hardening. The problem here is that the low intensity region of the wedge field can produce low precision measurements which can reduce the calibration precision in this region. For two dimensional arrays, an intermediate rotation of the array can be made such that off axis detectors occupy detector locations formerly occupied by the linear array. Then relative sensitivities of the off axis detectors can be calculated to the array detector's sensitivity, which is known to the normalizing detector's sensitivity. If another array intersects the linear array (i.e., two linear arrays), then the rotation should be made such that the second array occupies the first array's former position. Any number of rotations can be made to accommodate any two dimensional geometry, as long as the length of the linear array is sufficient to construct a diameter of rotation which includes all detectors to be calibrated in the array.

The following equations (1) through (52) have been developed for the Sun Nuclear Profiler array detector, model 1170. Although the equations are specific, modifications can easily be made to accommodate other array geometries. The field overlaps the detector array as discussed above. After equations (1) through (52) are discussed, their reference to FIGS. 1–11 will be described in detail.

Dose at Field Position x:$D_{x,t}$

The dose (rate) in the field at position 'x' is labeled $D_{x,t}$ where 't' denotes the time dependence of the dose (rate). Throughout this discussion, it is understood that dose or rate are terms which describe a radiation dose over a given time interval 't' and/or the rate at a specific time 't'. The dose amplitude of the machine can vary with time, but it is assumed that the dose distribution will not vary with time, i.e., will not vary over any of the calibration measurement intervals. On some machines, it may be required to turn the radiation on and allow time for stabilization before making measurements. This assumption can be stated as equation (1):

$$\frac{D_{n,a}}{D_{m,a}} = \frac{D_{n,b}}{D_{m,b}} = \frac{D_{n,c}}{D_{m,c}} = \frac{D_{n,d}}{D_{m,d}} \qquad (1)$$

where a, b, c, and d are measurement intervals corresponding to detector array orientations; for any field position n and m.

Sensitivity of Detector $j$: $S_{j,t}$

The sensitivity of detector 'j' is labeled $S_{j,t}$ where 't' denotes the time (or environmental) dependence of the detector sensitivity as experienced during the equilibration time while the radiation is on. The sensitivity of the detectors may continue to approach their equilibrium values with radiation time, but it is assumed that all the detectors will have the same proportional sensitivity change with radiation time. If the change in sensitivity with dose is significant, then the assumption that they all change the same proportion can be mitigated by pre-measurement radiation time.

This assumption can be stated as equation (2):

$$\frac{S_{n,a}}{S_{m,a}} = \frac{S_{n,b}}{S_{m,b}} = \frac{S_{n,c}}{S_{m,c}} = \frac{S_{n,d}}{S_{m,d}} \quad (2)$$

where a, b, c, and d again are the measurement intervals; for any detector n and m.

Detector Readings: $R_{j,x}$

The measured reading from detector 'j' at position 'x', $R_{j,x}$, is expressed as the product of the detector sensitivity and the dose to the detector in equation (3).

$$R_{j,x} = S_{j,t} \cdot D_{x,t} \quad (3)$$

where 't' represents any measurement interval with a dose and time duration as discussed above for sensitivity $S_{j,t}$ and dose $D_{x,t}$.

Setup and Data Collection With the Profiler

Measurements are made under four different geometries, labeled as data sets A, B, C, and D. Adjust the field size to 25 cm×25 cm at 100 cm SSD. Position the Profiler surface at 104 cm SSD which will provide a field size of 26 cm square on the Profiler surface. The Profiler detectors span 22.5 cm. The field size and SSD are specified because the maximum electron cones are 25 cm square, and we want a 26 cm field. Photons can be adjusted to 26 cm, but it is best if the procedure is consistent and feasible for all beams.

Data Set A: Orientation of the array such that "B" was toward the gantry ("B" refers to the blue colored "B" on the overlay). Align the crosshairs of the light field so that it lies on the dotted intersection on the Profiler, between detectors 23 and 24. The axial orientation was arbitrarily chosen; calibrating on the transverse axis will also work and may be advantageous for use on the transverse orientation.

Data Set B. Rotation of the Profiler 90 degrees clockwise, so that again the crosshairs align perfectly on the Profiler, between detectors 23 and 24.

Data Set C. Rotation of the Profiler another 90 degrees clockwise, with the crosshairs aligned perfectly on the Profiler, between detectors 23 and 24, and "B" pointed away from the gantry.

Data Set D. Linear translation of the Profiler 5 mm away from gantry, such that detector 2→1, 3→2, etc. The cross hair should now fall between detectors 24 and 25.

After the measurements are made, four data arrays A, B, C, and D will exist, whose elements can be labeled as follows in Tables A, B, C, & D.

TABLES A, B, C, & D

Data Array Structure for Profiler Calibration

| Element | A | B | C | D |
|---|---|---|---|---|
| 1 | $R_{1,46}$ | $R_{1,u}$ | $R_{1,1}$ | $R_{1,0}$ |
| 2 | $R_{2,45}$ | $R_{2,u}$ | $R_{2,2}$ | $R_{2,1}$ |
| ↓ | ↓ | ↓ | ↓ | ↓ |
| 7 | $R_{7,40}$ | $R_{7,51}$ | $R_{7,7}$ | $R_{7,6}$ |
| 8 | $R_{8,39}$ | $R_{8,50}$ | $R_{8,8}$ | $R_{8,7}$ |
| ↓ | ↓ | ↓ | ↓ | ↓ |
| 23 | $R_{23,24}$ | $R_{23,u}$ | $R_{23,23}$ | $R_{23,22}$ |
| 24 | $R_{24,23}$ | $R_{24,u}$ | $R_{24,24}$ | $R_{24,23}$ |
| ↓ | ↓ | ↓ | ↓ | ↓ |
| 39 | $R_{39,8}$ | $R_{39,49}$ | $R_{39,39}$ | $R_{39,38}$ |
| 40 | $R_{40,7}$ | $R_{40,48}$ | $R_{40,40}$ | $R_{40,39}$ |
| ↓ | ↓ | ↓ | ↓ | ↓ |
| 45 | $R_{45,2}$ | $R_{45,u}$ | $R_{45,45}$ | $R_{45,44}$ |
| 46 | $R_{46,1}$ | $R_{46,u}$ | $R_{46,46}$ | $R_{46,45}$ |
| 48 | $R_{48,51}$ | $R_{48,7}$ | $R_{48,48}$ | $R_{48,u}$ |
| 49 | $R_{49,50}$ | $R_{49,8}$ | $R_{49,49}$ | $R_{49,u}$ |
| 50 | $R_{50,49}$ | $R_{50,39}$ | $R_{50,50}$ | $R_{50,u}$ |
| 51 | $R_{51,48}$ | $R_{51,40}$ | $R_{51,51}$ | $R_{51,u}$ |

Detectors 48, 49, 50, and 51 are the off axis detectors and are located under the blue squares labeled "L" and "R", 48 being on the far left and sequentially numbered so that 51 is on the far right. They are equidistant from the array center and occupy the same positions as 7, 8, 39, and 40 when rotated 90 degrees.

The subscript "u" refers to a spatial position formerly unoccupied. Since that is the case, there is no other reading from another detector which can be used to calculate relative sensitivity.

Calibration Factor Analysis

The calibration factor is defined as a multiplicative value such that when it is multiplied times a detector reading, the product corrects the reading relative to another detector.

The calibration factor for detector 2 with respect to detector 1 can then be written as equation (4):

$$cf_2 = \frac{S_1}{S_2} = \frac{S_{1,c}}{S_{2,c}} \quad (4)$$

where the sensitivity ratio $S_1/S_2$ corrects the output of detector 2 so that its use results in the same value as that which would be measured by detector 1 if it were in detector 2's position. The second expression, $S_{1,c}/S_{2,c}$, simply follows from the assumption that sensitivity ratio of detectors 1 and 2 is constant, regardless of the irradiation conditions of A through D. The choice of subscripts sets up the expression for substitution and allows proper variable bookkeeping during the analysis.

In order to calculate $cf_2$, readings made on detectors 1 and 2 will be substituted for the sensitivity expressions.

From equation (3) and Tables A, B, C & D above, we can write equation (5):

$$R_{1,1} = S_{1,c} \cdot D_{1,c} \text{ and } R_{2,1} = S_{2,d} \cdot D_{1,d} \quad (5)$$

Rearranging terms in equation (5), we have sensitivity expressions in equation (6):

$$S_{1,c} = \frac{R_{1,1}}{D_{1,c}} \text{ and } S_{2,d} = \frac{R_{2,1}}{D_{1,d}} \quad (6)$$

From equation (2), $S_{2,c}$ can be expressed as equation (7):

$$S_{2,c} = S_{2,d} \cdot \frac{S_{1,c}}{S_{1,d}} \qquad (7)$$

Substituting equations (6) and (7) into (4) results in equation (8):

$$cf_2 = \frac{S_{1,c}}{S_{2,d} \cdot \frac{S_{1,c}}{S_{1,d}}} = \frac{R_{1,1}}{R_{2,1}} \cdot \frac{D_{1,d}}{D_{1,c}} \cdot \frac{S_{1,d}}{S_{1,c}} \qquad (8)$$

At this point, $cf_2$ is the ratio of two known readings found in sets C and D, times the ratios of the change in dose from set C to D and the detector group's sensitivity change from set C to D. These last two ratios are unknown, but can be solved as shown below.

In like manner, we can express the calibration factor for detector 3 in equation (9).

$$cf_3 = \frac{S_1}{S_3} = \frac{S_{1,c}}{S_{2,c}} \cdot \frac{S_{2,c}}{S_{3,c}}, \qquad (9)$$

where the expansion was performed by multiplying with $S_{2,c}/S_{2,c}$. The first term in the expansion is $cf_2$, as expressed in equation (4) and derived in equation (8). The second term can be expanded in the same manner which will result in equation (10):

$$cf_3 = \left( \frac{R_{1,1}}{R_{2,1}} \cdot \frac{D_{1,d}}{D_{1,c}} \cdot \frac{S_{1,d}}{S_{1,c}} \right) \cdot \left( \frac{R_{2,2}}{R_{3,2}} \cdot \frac{D_{2,d}}{D_{2,c}} \cdot \frac{S_{2,d}}{S_{2,c}} \right) \qquad (10)$$

Equation (10) can be simplified from the relationship in equations (1) and (2). By re-arranging terms and with the introduction of new notation $D_{dc}$ and $S_{dc}$ shown in equation (11).

$$cf_3 = \frac{R_{1,1}}{R_{2,1}} \cdot \frac{R_{2,2}}{R_{3,2}} \cdot (D_{dc} \cdot S_{dc})^2 \qquad (11)$$

where:

$$D_{dc} = \frac{D_{n,d}}{D_{n,c}} \text{ and } S_{dc} = \frac{S_{n,d}}{S_{n,c}}$$

for any field position n, and any detector n.

The calibration factor for detector 4 can be found with the same expansion technique and substitution method as used for detector 3. This results in equation (12).

$$cf_4 = \frac{R_{1,1}}{R_{2,1}} \cdot \frac{R_{2,2}}{R_{3,2}} \cdot \frac{R_{3,3}}{R_{4,3}} \cdot (D_{dc} \cdot S_{dc})^3 = \left[ \prod_{i=1}^{3} \frac{R_{i,i}}{R_{i+1,i}} \right] \cdot (D_{dc} \cdot S_{dc})^3 \qquad (12)$$

The series product notation has been introduced to simplify the equation and to illustrate the step taken in equation (13), the general calibration factor for detector n. To further simplify the expression, we will substitute the array notation into the series product. From Tables A, B, C & D, the elements in data set [C] represent $R_{i,i}$ and the elements in data set [D] represent $R_{i+1,i}$.

Therefore, we can write a general expression for the nth detector's calibration factor as equation (13):

$$cf_n = \left[ \prod_{i=1}^{n-1} \frac{C_i}{D_{i+1}} \right] \cdot (D_{dc} \cdot S_{dc})^{n-1} \qquad (13)$$

where $C_i$ represents array elements $R_{i,i}$ $D_{i+1}$ represents array elements $R_{i+1,i}$ n represents any detector number 2 through E, the end detector of the linear array. For the single Profiler, E=46.

At this point, cf is not yet computable. The product series is computable, but the term $(D_{dc}S_{dc})^{n-1}$ is unknown. $D_{dc}$ is the ratio of the change in dose from set C to D. Such a ratio is easily measured by placing a reference detector at a stationary location in the field. However, any measurement error on the reference detector (due to precision limits, slight sensitivity change, or a subtle scatter change from the translation) from dose C to D will propagate through the product series as indicated by the power of (n-1). A slight reference error of 0.05% will result in an error at the end of a 46 detector array of 2.3%. It is difficult, if not impossible, to actually determine if such an error occurred. It is possible to eliminate the reference detector by counting the number of accelerator pulses and make both sets C and D have the same pulse count. Statistically, over a large number of pulses, the dose per pulse variation may cancel or reduce the dose ratio error to acceptable levels, but this uncertainty is also indeterminate. Some machines do not have a sufficient dose per pulse stability to allow such a solution.

$S_{dc}$ is the detector group's sensitivity change from set C to D. If the reference detector and the array detectors were identical, then this term might cancel by the assumption made in equation (2). If pulses are counted, then this error needs to be dealt with. Again, it is not unreasonable to have a sensitivity change, due to a change in environmental conditions or stabilization equilibrium, of 0.05% or more, which will cause an unacceptable error bias.

The $D_{dc}S_{dc}$ error bias can be solved independently by measuring the field symmetry at two points coincident to the end detectors (or other pair of mirror locations). This can be done with a single detector, such as an ion chamber. Then, with the cfs calculated from (13) by assuming $D_{dc}S_{dc}=1$, a computed profile from the array will include the actual bias, resulting in a different symmetry ratio for the end detectors (or other mirror detectors). Now the true $D_{dc}S_{dc}$ can be solved and applied in (13) to find the correct cfs.

Yet another method to find $D_{dc}S_{dc}$ can be the combination of a narrow field calibration and a wide field calibration from translation only. In this case, we know, with reasonable precision, what the relative cfs are for the end detectors (or mirror detectors). Again, with the cfs calculated from (13) by assuming $D_{dc}S_{dc}=1$, a ratio of the end detector cfs from the wide and narrow beam calibrations can be used to calculate the wide field calibration bias.

A more direct solution, which follows, comes from a 180 degree rotation of the array such that the end detectors occupy each other's former positions in the field. A set of mirrored calibration factors, cfm, can be computed and used to solve for the bias in the translation method.

Mirror Calibration Factors (cfm) from Rotation

The data sets A and C, described earlier, result from a detector array rotation of 180 degrees. See Tables A, B, C & D.

The mirror calibration factor, cfm, for end detector E, is equation (14).

$$cfm_E = \frac{S_1}{S_E} = \frac{S_{1,c}}{S_{E,c}} = \frac{S_{1,a}}{S_{E,a}} \quad (14)$$

which follows from equations (2) and (4). In this particular cfm, there is no difference between $cfm_E$ and $cf_E$, because both are with respect to detector 1. Note, all cfs are normalized around detector 1. However, cfm for any detector other than the end will be with respect to its mirrored partner detector, i.e., $cfm_{E-2}$ is the calibration factor of detector (E-2) with respect to detector 3.

There are two expressions for $cfm_E$ which can be expanded, as was done on (4) through (8). The sensitivity from data set C will be expanded first to illustrate the solution.

From equation (3) and Tables A, B, C & D above, we can write equation (15):(46 has been substituted for E in the following, but the equations will be re-generalized with E later)

$$R_{1,1} = S_{1,c} \cdot D_{1,c} \text{ and } R_{46,1} = S_{46,a} \cdot D_{1,a} \quad (15)$$

Rearranging terms in equation (15), we have sensitivity expressions in equation (16):

$$S_{1,c} = \frac{R_{1,1}}{D_{1,c}} \text{ and } S_{46,a} = \frac{R_{46,1}}{D_{1,a}} \quad (16)$$

From equation (2), $S_{46,c}$ can be expressed as equation (17):

$$S_{46,c} = S_{46,a} \cdot \frac{S_{1,c}}{S_{1,a}} \quad (17)$$

Substituting equations (16) and (17) into (14) results in equation (18):

$$cfm_{46} = \frac{S_{1,c}}{S_{46,a} \cdot \frac{S_{1,c}}{S_{1,a}}} \quad (18)$$

$$= \frac{R_{1,1}}{R_{46,1}} \cdot \frac{D_{1,a}}{D_{1,c}} \cdot \frac{S_{1,a}}{S_{1,c}}$$

$$= \frac{R_{1,1}}{R_{46,1}} \cdot (D_{ac} \cdot S_{ac})$$

using the notation introduced in (11).

Equation (18) resulted from expanding the sensitivity from data set C in the third expression in (14). Now the fourth expression in (14), data set A, will be expanded. In a parallel derivation, we can write equations (19), (20), (21), & (24):

$$R_{1,46} = S_{1,a} \cdot D_{46,a} \text{ and } R_{46,46} = S_{46,c} \cdot D_{46,c} \quad (19)$$

$$S_{1,a} = \frac{R_{1,46}}{D_{46,a}} \text{ and } S_{46,c} = \frac{R_{46,46}}{D_{46,c}} \quad (20)$$

$$S_{46,a} = S_{46,c} \cdot \frac{S_{1,a}}{S_{1,c}} \quad (21)$$

$$cfm_{46} = \frac{S_{1,a}}{S_{46,c} \cdot \frac{S_{1,a}}{S_{1,c}}} \quad (22)$$

$$= \frac{R_{1,46}}{R_{46,46}} \cdot \frac{D_{46,c}}{D_{46,a}} \cdot \frac{S_{1,c}}{S_{1,a}}$$

$$= \frac{R_{1,46}}{R_{46,46}} \cdot (D_{ca} \cdot S_{ca})$$

We now have two expressions for $cfm_{46}$ in equations (18) and (22). Equating these and recognizing that $(D_{ca} S_{ca}) = (D_{ac} S_{ac})^{-1}$, we have a solution for $cfM_{46}$.

$$(D_{ac} \cdot S_{ac})^2 = \frac{R_{1,46}}{R_{46,46}} \cdot \frac{R_{46,1}}{R_{1,1}} \quad (23)$$

Substituting $D_{ac} S_{ac}$ back into equation (18) and reducing, we have equation (24)

$$cfm_{46} = \sqrt{\frac{R_{1,1}}{R_{46,46}} \cdot \frac{R_{1,46}}{R_{46,1}}} = \sqrt{\frac{C_1}{C_{46}} \cdot \frac{A_1}{A_{46}}} \quad (24)$$

We now have a unique solution for $cf_E$ since $cfm_E = cf_E$, the calibration factor of the end detector E, (Profiler detector 46), with respect to detector 1. This allows a solution for $D_{dc} S_{dc}$ in equation (13). Combining equations (13) and (24), where n=E, we have equation (25).

$$\left[\prod_{i=1}^{E-1} \frac{C_i}{D_{i+1}}\right] \cdot (D_{dc} \cdot S_{dc})^{E-1} = \sqrt{\frac{C_1}{C_E} \cdot \frac{A_1}{A_E}} \quad (25)$$

Taking the log and solving for $D_{dc} S_{dc}$, we have equation (26)

$$\ln(D_{dc} \cdot S_{dc})_E = \frac{1}{E-1} \cdot \left[\frac{1}{2} \ln\left(\frac{C_1}{C_E} \cdot \frac{A_1}{A_E}\right) - \sum_{i=1}^{E-1} \ln \frac{C_i}{D_{i+1}}\right] \quad (26)$$

The subscript E has been attached to the $D_{dc} S_{dc}$ term because it was solved from the rotation analysis of the E and first detector.

The original goal was to solve for $D_{dc} S_{dc}$ in order to calculate the correction factors in (13). Now we observe that there are several solutions for $D_{dc} S_{dc}$, one for each pair of mirror detectors. Differences between solutions may be due to several factors:

1. Measurement precision of any given detector
2. Scatter differences at different detector locations caused by the translation between D and C
3. Profile shape change due to energy change between D and C
4. Non-uniform detector sensitivity changes
5. Errors in all the above, caused by the differences between A and C.

Analysis of such differences may reveal the cause, however, such differences may be from a combination of the reasons. For now, we will stick with our initial assumptions that the scatter conditions do not change when the detector array is moved and that the profile shape in unchanged. We can calculate all values of $D_{dc} S_{dc}$ and use the average to calculate the calibration factors. Any violations to these assumptions will be imbedded in the average. If the differences between the values of $D_{dc}S_{dc}$ are significant, then this may be cause to investigate the source of error.

A similar analysis can be performed on all other sets of mirror detectors. By reference to equation (24), we can write a general expression for $cfm_n$,—equation (27)

$$cfm_n = \sqrt{\frac{C_{E-n+1}}{C_n} \cdot \frac{A_{E-n+1}}{A_n}} \tag{27}$$

where $n=[E/2]+1 \rightarrow E$; when E is even, as is the case for the Profiler $n=[(E+1)/2]+1 \rightarrow E$; when E is odd.

In order to use equation (27) to calculate the average of $D_{dc}S_{dc}$, the mirror calibration factors from translation need to be determined.

Mirror Calibration Factors (cfm) from Translation

The mirror calibration factors from translation are already imbedded in the general expression for the calibration factor, equation (13).

For example, in the Profiler, the two closest mirror detectors are 23 and 24. The mirror calibration factor for this detector pair is equation (28).

$$cfm_{24} = \frac{S_{23}}{S_{24}} = \frac{S_{23,c}}{S_{24,c}} \tag{28}$$

This expression can be expanded and reduced, following the method described between equations (4) and (8). The results are equation (29).

$$cfm_{24} = \frac{C_{23}}{D_{24}} \cdot (D_{dc} \cdot S_{dc}) \tag{29}$$

Likewise, $cfm_{25}$ can be derived from equation (30):

$$cfm_{25} = \frac{S_{22}}{S_{25}} = \frac{S_{22,c}}{S_{23,c}} \cdot \frac{S_{23,c}}{S_{24,c}} \cdot \frac{S_{24,c}}{S_{25,c}} \tag{30}$$

Expansion and reduction of these terms results in equation (31):

$$cfm_{25} = \frac{C_{22}}{D_{23}} \cdot \frac{C_{23}}{D_{24}} \cdot \frac{C_{24}}{D_{25}} \cdot (D_{dc} \cdot S_{dc})^3 \tag{31}$$

Following this pattern, we can write the general expression equation (32) for the mirror calibration factors by translation, $$cfm_n = \left[\prod_{i=E-n+1}^{n-1} \frac{C_i}{D_{i+1}}\right] \cdot (D_{dc} \cdot S_{dc})^{2n-(E+1)} \tag{32}$$

where $n=[E/2]+1 \rightarrow E$; when E is even, as is the case for the Profiler $n=[(E+1)/2]+1 \rightarrow E$; when E is odd.

Combining equations (27) and (32) and solving for $(D_{dc}S_{dc})_n$, we have equation (33):

$$\ln(D_{dc} \cdot S_{dc})_n = \tag{33}$$
$$\frac{1}{2n-(E+1)} \cdot \left[\frac{1}{2}\ln\left(\frac{C_{E-n+1}}{C_n} \cdot \frac{A_{E-n+1}}{A_n}\right) - \sum_{i=E-n+1}^{n-1} \ln\frac{C_i}{D_{i+1}}\right]$$

Finally, we can rewrite the general expression equation (34) for the calibration factor $cf_n$ from equations (13) and (33) as:

$cf_1=1.000$, by definition, and, for all other detectors n in the linear array, n=2 through E $$cf_n = \left[\prod_{i=1}^{n-1} \frac{C_i}{D_{i+1}}\right] \cdot e^{(n-1)\cdot\overline{\ln(D_{dc} \cdot S_{dc})}} \tag{34}$$

where the average of $\ln(D_{dc}S_{dc})$, for all mirror pairs, is found from equation (35):

$$\overline{\ln(D_{dc} \cdot S_{dc})} = \frac{1}{E-p+1} \cdot \sum_{i=p}^{E} \ln(D_{dc} \cdot S_{dc})_i \tag{35}$$

and $p=[E/2]+1$ when E is even $p=[(E+1)/2]+1$ when E is odd.

E=End detector number in the linear array.

Calibration Factors for Off Axis Detectors

The detector array can be rotated in a way such that, during one of the beam measurements, the off axis detectors occupy the spatial location of detectors in the linear array during a prior or future measurement. For example, in Tables A, B, C & D, data set B shows detector 48 occupying the spatial position 7, which was occupied by detector 40 in data set A and will be occupied by detector 7 in data set C. In reading Tables A, B, C & D, recall from equation 3 that the table entries, $R_{j,x}$, refer to the measured reading from detector 'j' at position 'x'. To locate position 7 in the data sets, find "7" in the second subscript of the data set column.

Referring to the discussion of calibration factors with equation 4, the calibration factor for detector 48 with respect to detector 1 can be written as equation (36):

$$cf_{48} = \frac{S_1}{S_{48}} = \frac{S_1}{S_7} \cdot \frac{S_7}{S_{48}} = cf_7 \cdot \frac{S_{7,b}}{S_{48,b}} \tag{36}$$

The third expression in equation (36) is a simple identity expansion. The expansion was carried out around detector 7 first, rather than detector 40, for arbitrary reasons. The ratio $S_1/S_7$ is simply the calibration factor for detector 7, and was written as such in the fourth expression of (36). The ratio $S_7/S_{48}$, by reference to equation (2), can be written with data set B, as indicated by the subscript b, as seen the fourth expression of (36), but could also have been written with the data set subscript c as will happen in the next expansion. The following expansion will use a similar derivation method as used in equations (5) through (8).

In order to calculate $S_7/S_{48}$, readings made on detectors 7 and 48 will be substituted for the sensitivity expressions. From equation (3) and Tables A, B, C & D above, we can write:

$$R_{48,51}=S_{48,a} \cdot D_{51,a} \text{ and } R_{7,51}=S_{7,b} \cdot D_{51,b} \tag{37}$$

Rearranging terms in equation (37), we have sensitivity expressions in equation (38):

$$S_{48,a} = \frac{R_{48,51}}{D_{51,a}} \text{ and } S_{7,b} = \frac{R_{7,51}}{D_{51,b}} \quad (38)$$

From (2), $S_{48,b}$ can be expressed as equation (39):

$$S_{48,b} = S_{48,a} \cdot \frac{S_{7,b}}{S_{7,a}} \quad (39)$$

Substituting equations (38) and (39) into the fourth expression of (36) results in equation (40):

$$cf_{48} = cf_7 \cdot \frac{S_{7,b}}{S_{48,a} \cdot \frac{S_{7,b}}{S_{7,a}}} \quad (40)$$

$$= cf_7 \cdot \frac{R_{7,51}}{R_{48,51}} \cdot \frac{D_{51,a}}{D_{51,b}} \cdot \frac{S_{7,a}}{S_{7,b}}$$

$$cf_{48} = cf_7 \cdot \frac{B_7}{A_{48}} \cdot (D_{ab} \cdot S_{ab})$$

At this point, $cf_{48}$ is the product of $cf_7$ times the ratio of two known readings found in sets B and A, times the ratios of the change in dose from set A to B and the detector group's sensitivity change from set A to B, which have been denoted as $(D_{ab}S_{ab})$, following the convention defined earlier in equation (10). These last two ratios are unknown, but will be solved uniquely from another expansion of $cf_{48}$ through detector 40. There are three other expansions of $cf_{48}$ which can be performed.

Continuing with detector 7 expansion, data sets B and C contain common data at position 7, namely $R_{48,7}$ in B and $R_{7,7}$ in C. Using the same methods as described for equations (36) through 40, results in the following equation (41):

$$cf_{48} = cf_7 \cdot \frac{S_{7,c}}{S_{48,c}} \quad (41)$$

$$= cf_7 \cdot \frac{\frac{R_{7,7}}{D_{7,c}}}{\frac{R_{48,7}}{D_{7,B}} \cdot \frac{S_{7,c}}{S_{7,b}}}$$

$$cf_{48} = cf_7 \cdot \frac{C_7}{B_{48}} \cdot (D_{bc} \cdot S_{bc})$$

Although equation (41) resulted in another solution of $cf_{48}$, another unknown $(D_{bc}S_{bc})$ appeared in the set of equations which does not allow a solution of $cf_{48}$. A review of Tables A, B, C & D reveals that detector 40 also occupied positions 48 and 7 which will allow two more expansion of $cf_{48}$. Again, in a manner similar to that described for equation (36) through (40), equation (42) expresses $cf_{48}$ as:

$$cf_{48} = cf_{40} \cdot \frac{S_{40,a}}{S_{48,a}} \quad (42)$$

$$= cf_{40} \cdot \frac{\frac{R_{40,7}}{D_{7,a}}}{\frac{R_{48,7}}{D_{7,b}} \cdot \frac{S_{40,a}}{S_{40,b}}}$$

$$cf_{48} = cf_{40} \cdot \frac{A_{40}}{B_{48}} \cdot (D_{ba} \cdot S_{ba})$$

and equation (43) as:

$$cf_{48} = cf_{40} \cdot \frac{S_{40,b}}{S_{48,b}} \quad (43)$$

$$= cf_{40} \cdot \frac{\frac{R_{40,48}}{D_{48,b}}}{\frac{R_{48,48}}{D_{48,c}} \cdot \frac{S_{40,b}}{S_{40,c}}}$$

$$cf_{48} = cf_{40} \cdot \frac{B_{40}}{C_{48}} \cdot (D_{cb} \cdot S_{cb})$$

Equation (42) has a term $(D_{ba}S_{ba})$ which is the inverse of the term $(D_{ab}S_{ab})$ seen in equation 40. This follows from the definitions of D and S (see equations 1 and 2), which was also employed in the discussion leading to (22). With this, we now have equations (40) and (42) with two unknowns and equations (41) and (42) with two unknowns; either combination can now be solved for $cf_{48}$.

Starting with equation (42) and recognizing that $(D_{ba}S_{ba})=(D_{ab}S_{ab})^{-1}$, we have equation (44)

$$D_{ab} \cdot S_{ab} = \frac{cf_{40}}{cf_{48}} \cdot \frac{A_{40}}{B_{48}} \quad (44)$$

which can then be substituted back into equation (40) for a quadratic solution of $cf_{48}$ in equation (45).

$$cf_{48} = \sqrt{cf_7 \cdot cf_{40} \cdot \frac{A_{40}}{A_{48}} \cdot \frac{B_7}{B_{48}}} \quad (45)$$

Another solution exists between equations (41) and (43). Since both solutions are equivalent, they will be averaged into one, as expressed in equation (46).

$$cf_{48} = \frac{1}{2} \cdot \left[ \sqrt{cf_7 \cdot cf_{40} \cdot \frac{A_{40}}{A_{48}} \cdot \frac{B_7}{B_{48}}} + \sqrt{cf_7 \cdot cf_{40} \cdot \frac{B_{40}}{B_{48}} \cdot \frac{C_7}{C_{48}}} \right] \quad (46)$$

Equation (46) is very symmetrical and allows a generalization to a special two dimensional array. First, the linear array calibration factors, $cf_7$ and $cf_{40}$, which establish the numerical link to detector 1, are equidistant from the center of rotation to detector 48. Second, their product under the square root preserves the virtual units of cf. Third, the data elements which form ratios appear as pseudo calibration factors from rotation. For example, $cf_7*(B_7/A_{48})$ has the intuitive form of the calibration factor by substitution of detector 48 with respect to detector 1 through detector 7 (see equation 36). Fourth, the only asymmetry, $A_{40}$ and $C_7$, results from the clockwise rotation of A into B and B into C which locates detector 48 into position 7 for data set B. Position 7 was also the location of detector 40 during data set A and detector 7 during data set C. If the rotation was counter clockwise, then the elements $A_7$ and $C_{40}$ would be in the equation. However, for the clockwise rotation, the equation for $cf_{51}$ will contain $A_7$ and $C_{40}$ in the numerator.

From the above symmetry discussion, a general equation for calibration factors of detectors which exist on any radial array whose axis intersects the linear array's point of rotation at angle α can be expressed as equation (47):

$$cf_{k,\alpha} = \frac{1}{2} \cdot \sqrt{cf_n \cdot cf_{E-n+1}} \cdot \left[ \sqrt{\frac{A_{E-n+1}}{A_{k,\alpha}} \cdot \frac{B_n}{B_{k,\alpha}}} + \sqrt{\frac{B_{E-n+1}}{B_{k,\alpha}} \cdot \frac{C_n}{C_{k,\alpha}}} \right] \quad (47)$$

where k is the detector number in the radial array which is coincident to detector n in the linear array, counting from the position of detector 1 in the linear array after the required clockwise rotation of $\alpha$ degrees for coincidence. E is the number of detectors in the linear array. E can be even or odd. Data sets A, B, and C have been described earlier. If more than one radial array exists, the data sets could be numbered B1, B2, B3, etc., in order to keep the terminology consistent with the earlier discussion for the linear array calibration whose independent calibration data lies in data sets A, C, and D. For convenience, only a single subscript is used when $\alpha=0$ because this is the linear array.

In the example of the Profiler, the value of k for detector 48 is 7 because detector 7 of the linear array occupies the radial array detector 48's position on a 90 degree clockwise rotation. The subscript of detector 48 is also changed to 7,90. With these values, equation (46) results from equation (47) by substitution. Likewise, the subscripts for detectors 49, 50 and 51 are 8,90; 39,90 and 40,90 respectively. The 90 refers to the 90 degree clockwise rotation to achieve coincidence.

For radial arrays which have a common center detector to the linear array, another derivation could be performed for translation and rotation measurement along the radial axis as an alternative method for calibration factor calculation. The same method of expansion and substitution leading to (33), (34) and (35) will lead to calibration factors of the radial array with respect to its detector 1. This calibration is independent of the linear array but both share a common center, which can then be used to normalize the radial array to detector 1 in the linear array. This procedure is necessary when there is a lack of coincidence in off center detector positions, such as that found in radial array detector spacing which is not an integer multiple of the linear array detector spacing. Otherwise however, this is not necessary in view of the general solution of the radial array in equation (47) with calibration factors normalized to detector 1 in the linear array.

Calibration Factors for Detectors on Square or Rectangular Grids

The calibration factors for most or all detectors on a square grid or rectangular grid whose larger detector spacing is an integer multiple of the smaller detector spacing and whose array length along the smaller detector spacing is equal to or greater than the array length along the larger detector spacing can be calculated from four wide field exposures using the equations developed in the linear array and radial array. If the rows and columns are odd, then rotation around the center detector will calibrate all detectors. If the rows or columns are even, then the center of rotation can be selected as a detector such that only end detectors are not calibrated within four wide field measurements. For the sake of brevity, only rectangular grids will be discussed because square grids are a subset of rectangular grids.

Before getting into the analysis, there are three array definitions in the rectangular grid.

1. Linear Array: As the Linear Array, designate a row or column of detectors which has the smaller (or equal) detector spacing and the longer array length, and when rotated 90 degrees about its center, will extend out to or beyond the arrays which are orthogonal to the Linear Array. The calibration of the Linear Array by 180 degree rotation and shift will stand alone, not dependent upon any other factors. The smaller detector spacing and longer array length are required for coincidence to the Radial Array detector position after the 90 degree rotation.

2. Radial Array: Designate the detector array which intersects the Linear Array through the axis of rotation as the Radial Array.

3. Off Axis Arrays: These are the single dimension detector arrays parallel to the Linear Array.

Perform the measurements as described earlier, filling data sets A, B, C, and D. As before, B results from a 90 degree clockwise rotation which places the Radial Array detectors in the Linear Array detector positions.

After the measurements, calculate the calibration factors of the detectors in the Linear Array using equations (33), (34), and (35). The value of $(D_{dc} S_{dc})$ used in the solution of $cf_n$ in (34) can be the average from all mirror detectors as defined by (35), or any combination of mirror detectors in the Linear Array.

During the measurements of data sets C and D, not only were the Linear Array detectors substituted by translation, also the Off Axis detectors were substituted with the same index exchange as discussed in the derivation of (4) through (13). Therefore, (13) or (34) can be used to calculate the intermediate calibration factors for the Off Axis detectors. Furthermore, there is no difference between $(D_{dc} S_{dc})$ for the Linear array and $(D_{dc} S_{dc})$ for the Off Axis detectors because this is a bias correction for Dose or Sensitivity variations between measurements C and D. The value of $(D_{dc} S_{dc})$ used to calculate the Linear Array detector factors should also be used to calculate the intermediate Off Axis detector calibration factors. This calculation can be expressed as equation (48):

$$cf'_{n,k} = \left[ \prod_{i=1}^{n-1} \frac{C_i}{D_{i+1}} \right]_k \cdot e^{(n-1) \cdot \overline{\ln(D_{dc} \cdot S_{dc})}} \quad (48)$$

where k designates a column of Off Axis detectors and n is any detector number 2 to E in column k. Again, by definition from equation (34), $cf'_{1,k}=1.000$, which results in intermediate calibration factors. The goal is to have all detector calibration factors in the entire grid array relative to a common value so that application of these factors to the measured detector output will result in a dose distribution independent of any detector sensitivities. As it stands in (48), each Off Axis array calibration is independent from the other arrays. However, these Off Axis arrays can be tied together by the Radial Array detectors because each Off Axis array contains a detector from the Radial Array which can be calibrated to the Linear Array through the measurements in data set B.

Using the equation (47), calculate the Radial Array calibration factors. These values are not intermediate but are complete and relative to the Linear Array.

The final calibration factors for the Off Axis detectors can now be calculated. The solution will again involve an expansion around the simple definition of a calibration factor. Referring to the discussion around equation (4), the sensitivity of any Off Axis detector n,k with respect to detector 1 in the Linear Array can be expressed as equation (49):

$$cf_{n,k} = \frac{S_1}{S_{n,k}} = \frac{S_1}{S_{c,k}} \cdot \frac{S_{c,k}}{S_{1,k}} \cdot \frac{S_{1,k}}{S_{n,k}} = cf_{k,90} \cdot \frac{1}{cf'_{c,k}} \cdot cf'_{n,k} \qquad (49)$$

where n is a detector counter in the Off Axis column, consistent with the detector counter in the Linear Array, and k is the column counter in the detector grid, consistent with the Radial Array counter defined under equation (47).

The first term in the third expression of (49), $S_1/S_{c,k}$, is the sensitivity of detector 1 in the linear array divided by the sensitivity of the center detector c, in column k. The center detector, noted as "c", in each column falls on the Radial Array which is orthogonal to the columns and intersects the center of rotation. This ratio is the calibration factor for the kth detector in the radial array from a 90 degree rotation, as calculated in (47), and as noted by the term $cf_{k,90}$ in the fourth expression in (49). The second and third terms in the third expression of (49) are sensitivity ratios with respect to detector 1 in the Off Axis columns k, which are the intermediate calibration factors calculated in (48). Therefore, all terms are calculable and the calibration factors for the Off Axis Arrays are known. Expressed in words, the calibration factor of an Off Axis Array detector is its intermediate calibration factor times the ratio of the true and intermediate calibration factors for the center detector of the Off Axis Array.

There are other two dimensional array configurations which can also be calibrated with the substitutional technique. The required equations can be derived with the methodology described above.

Multiplexed Detector Arrays

In the discussion of array measurements which result in data sets A through D, there is a fundamental assumption that the individual detector measurements in linear and off axis array measurements are made during one dose period. For example, during a linear array calibration, the average clock time or pulse number contributing to each measured detector should be equal or nearly equal, where clock time is absolute time and pulse number is in order of occurrence. If all detectors measure all the radiation during the irradiation period, then this condition is satisfied. If detector one is measured during the first pulse, then detector two is measured during the second pulse, and so on, and if this sequence is repeated over many pulses, then this condition is generally satisfied. This is commonly referred to as a multiplexed array during measurement, where a subgroup of detectors is measured over a period of time and then another group is measured. Conditions are better satisfied as the time or pulse count increases. Then as dose variations occur throughout the measurement, the variation becomes less significant because it is distributed over the multiplexed measurements.

The average pulse number measured by a detector can be calculated from an arithmetic progression. The sum S of pulse numbers measured by a detector is equation (50):

$$S = \frac{P}{2N} \cdot (2n + P - N) \qquad (50)$$

where P is the total number of pulses, N is the number of detectors or detector groups multiplexed, and n is the detector number or detector group measured during the occurrence of the pulse number. The average pulse number is the sum S divided by the counted number of pulses measured by the detector, P/N.

Therefore, the average pulse number, AP, for detector n is equation (51):

$$AP_n = n + \frac{P - N}{2} \qquad (51)$$

The percent difference, APD, of the average pulse number between the first and last detector in the multiplexing sequence is then equation (52):

$$APD = \frac{AP_N - AP_1}{AP_1} \cdot 100 = 200 \cdot \frac{N - 1}{2 + P - N} \qquad (52)$$

From (52), as P increases, APD decreases. This equation can be used to estimate the total number of pulses over which to acquire data in order to reduce the influence of dose fluctuation between pulses. This does not actually calculate the error. It assumes that the dose fluctuation is random and not a periodic function of the multiplexer.

A multiplexed situation where equation (1) is not satisfied is when only one detector is measured during a pulse or time period and never measured again while the others are measured. For example, an array of 5 detectors, each measured only once by the same circuit for a period of 1000 radiation pulses, the first detector on the first 1000 pulses and so on until the fifth detector is measured on the last 1000 of 5000 pulses, is a measurement which does not satisfy the requirements of equation (1). If there is a dose change from the first 1000 pulses to the fifth 1000 pulses, then the dose profile constructed from the measurements is not representative of the simultaneous dose profile to the array. This is a fundamental violation to the requirements leading to the derivation of the calibration equations. However, if multiplexing occurs as described preceding equation (50), then such a dose per pulse change from the first 1000 to the last 1000 pulses will be averaged over all the detectors and will not be significant.

The multiplexing concept can be extended to the grid array of detectors. Here, each column could be measured over one pulse, with a repeating measurement pattern which would distribute the dose per pulse changes over all the columns. The advantage of multiplexing in such a grid array is a reduction of circuitry and associated cost.

FIG. 1 is a flow chart 50 detailing the 21 method steps for performing the novel calibration invention. FIG. 2A is a perspective view 100 of the radiation beam being sized by the collimators 120 of a typical radiotherapy machine 102, such as but not limited to a Clinac 2100 C/D Radiotherapy Accelerator, which emits photon beams or electron beams 110 to a target surface 130, such as a Beam Profiler 200, shown and described in detail in reference to FIGS. 3A–3B.

Figure 2B:
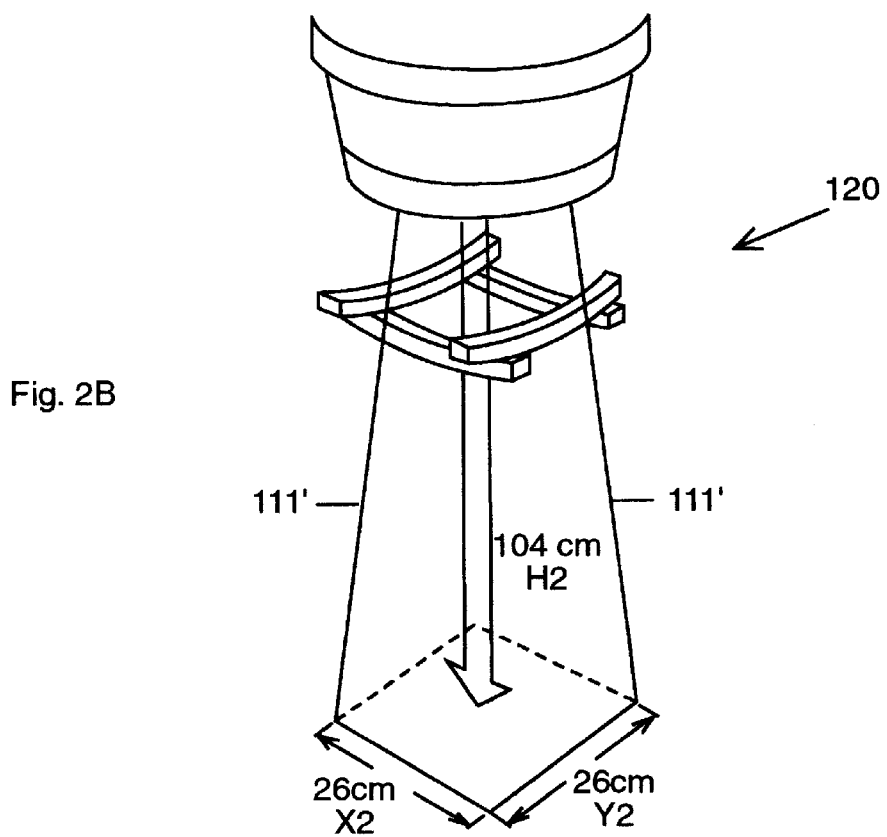
FIG. 2B shows the view of FIG. 2A having the collimators set and adjusting the distance.

Referring to Step 1 of FIG. 1 and FIG. 2A, the collimators 122, 124, 126, 128 are movable in the direction of arrows A1, A2, A3, and A4, respectively so that a selected beam field size 111 on a surface 130 can be selected. FIG. 2B shows the view of FIG. 2A having the distance h1 being adjusted to h2, resulting in a specific beam size 111' by geometric proportioning. Referring to FIGS. 1, 2A and 2B, step 1, has the field size 130 of beam 111 set to a square shape at x1=25 cm, and y1=25 cm and a beam height, h1 at 100 cm. Height (h1) is the distance from the target surface 130 (such as Profiler) to the beam focus in the accelerator.

Figure 3A:
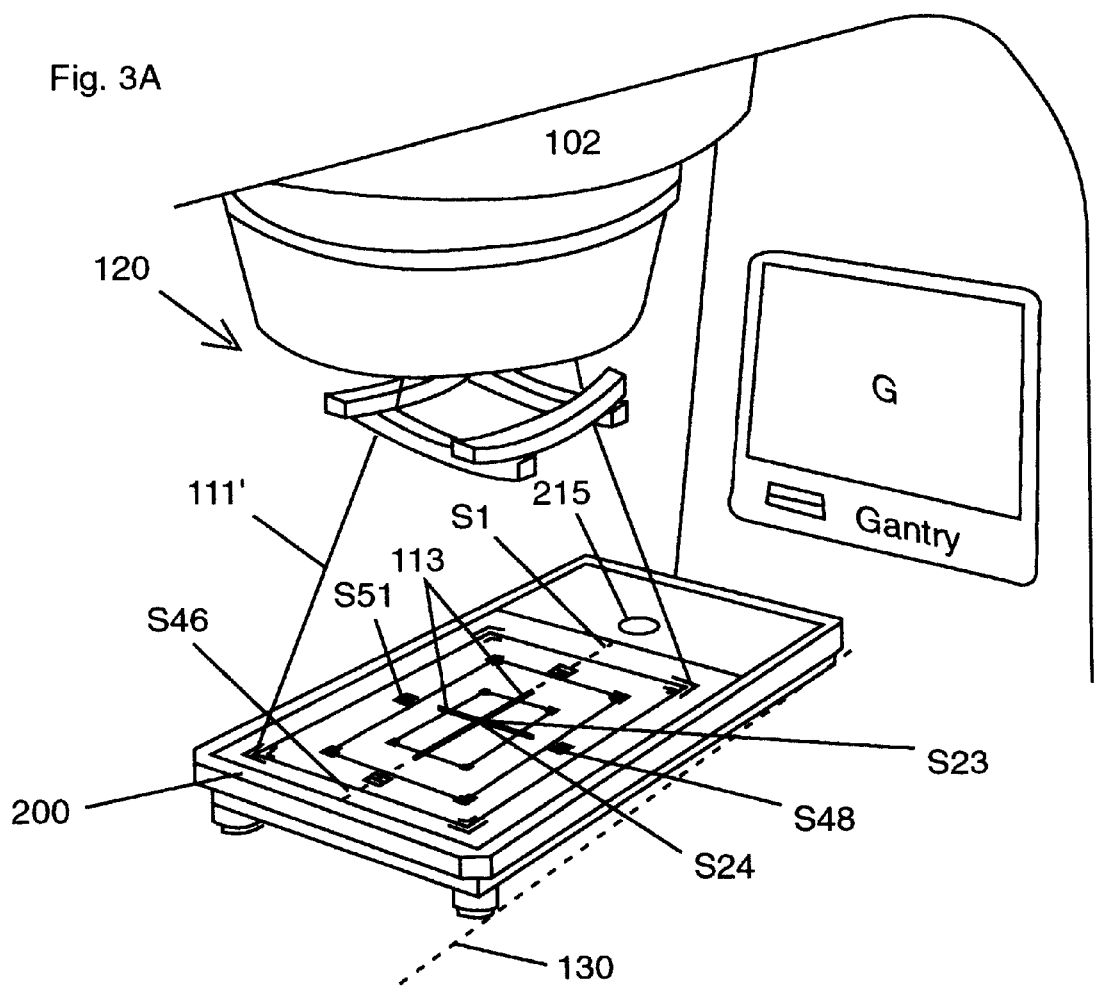
FIG. 3A is a perspective view of a beam profiler that can be used with the novel calibration invention of FIG. 1. The center is being adjusted to the cross hair.

Step 2 of FIG. 1 has the distance (height) adjusted to h2, approximately 104 cm, resulting in target surface dimensions of approximately x2=26 cm, and y2=26 cm. (Some collimators can only adjust to 25 cm beam size at a distance of 100 cm.) FIG. 3A is a perspective view of a beam profiler 200 that can be used with the novel calibration invention of the FIG. 1 steps, where the array profiler 200 is initially positioned on a surface 130, such as a table, so that the bubble level indicator 215, and the sensor, S1 is closest to the vertical Gantry support G, G1 of the Radiotherapy Accelerator, 102.

Figure 3B:
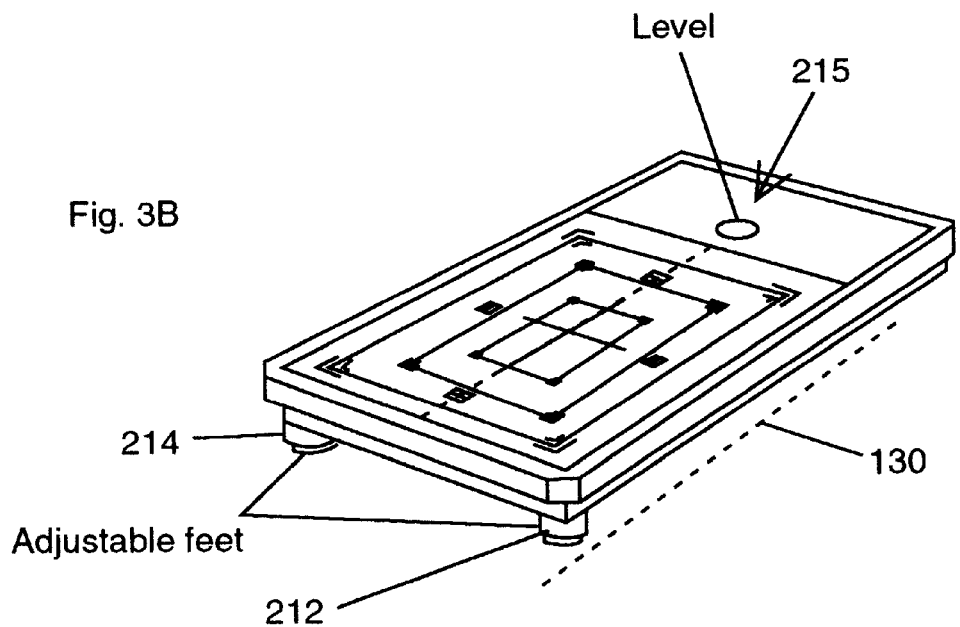
FIG. 3B shows leveling the beam profiler.

FIG. 3B is a view of the beam profiler 200 of FIG. 3A being leveled with indicator 215, as in steps 4, 8, 12, and 16. Referring to FIGS. 1, 3A and 3B, beam profiler 200 can be an array of 46 sensor diodes, S1–S46, and off-axis horizontal sensor diodes, S48–S51. A typical beam profiler 200 can be an off-the-shelf multi-sensor radiation detector array entitled: Profiler Model 1170, manufactured by the assignee of the subject invention, Sun Nuclear Corporation of Melbourne, Fla. The Sun-Nuclear, Profiler generates a real time graphic image of an accelerator's radiation output, where the image is a trace of individual data points spaced approximately 5 mm apart, and is updated each second. The 46 diodes, S1–S46, and off-axis detectors S48–S51 provide a real-time profile of the emitted radiation beams and off axis analysis.

Although the preferred embodiment description uses the Sun Nuclear Profiler, other types of multi-sensor radiation detector arrays can also be used with the novel calibration invention, such as but not limited to Victoreen, Cleveland Ohio, Model 7000 THEBES; Schustor, Germany, Model BMS96; Wellhofer Model CA24; and Scanditronix Model LDA11 and LDA25.

Step 3 of FIG. 1 has a user physically manipulate the profiler so that a crosshairs +, 113, cast by accelerator light field is aligned to be between diode sensors S23 and S24 as illustrated in FIG. 3A. Next, Step 4 of FIG. 1, has the user level Profiler array 200 by screwably adjusting lower legs 212, 214 so that bubble indicator 215 shows the array 200 to be level on a target surface 130, such as a table, and the like, as illustrated in FIG. 3B.

The crosshairs shadow indicats the beam center. The shadow is caused by the light field shining from the beam focus within the accelerator head 102, through the collimators 120 and upon an opaque cross arranged in the collimator center, such as a fine wire so as not to obstruct the radiation beam.

Figure 4:
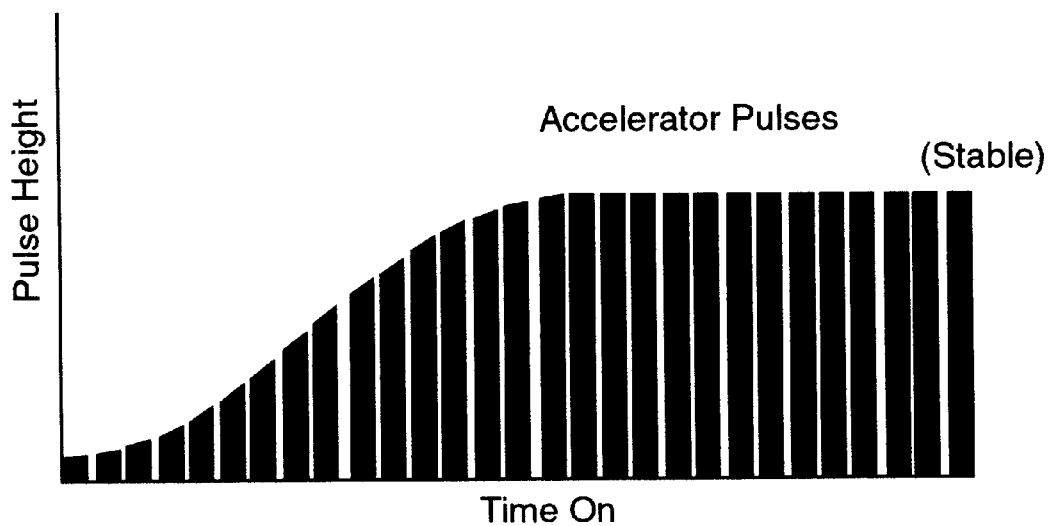
FIG. 4 is a chart illustrating the warm up period of the Accelerator pulses represented by pulse height verses time-on. The beam is allowed to stabilize before saving calibration data.

In Step 5 of FIG. 1, the beam 111' is turned on prior to data collection from the detector array in order to allow a stable condition to be reached as shown by the FIG. 4 graph. During the stabilization process the beam energy and shape may be fluctuating which would violate the calibration condition. When the beam is stable, there should be no changes, from pulse to pulse, of beam energy on field shape, i.e., flatness and symmetry.

Step 6 is represented by FIG. 5 with the beam profiler of FIG. 3B acquiring data from the emitted accelerator pulses of the beam 111'. Each diode detector, S1–S46 and S48–S51 acquires N pulses, where N can be equal to approximately 8,000 pulses for example. Array A represents the measured data acquisition during Step 6. Next, the beam 111' is turned off so Step 7 can occur.

Step 7, FIG. 6A, shows rotating the beam profiler array 200 of FIG. 5, clockwise ninety degrees in the direction of arrow R1 on surface 130, for the next calibration Step 10 of FIG. 1, (to be described later) with the cross-hair 113 aligned between diodes S23 and S24.

Figure 6B:
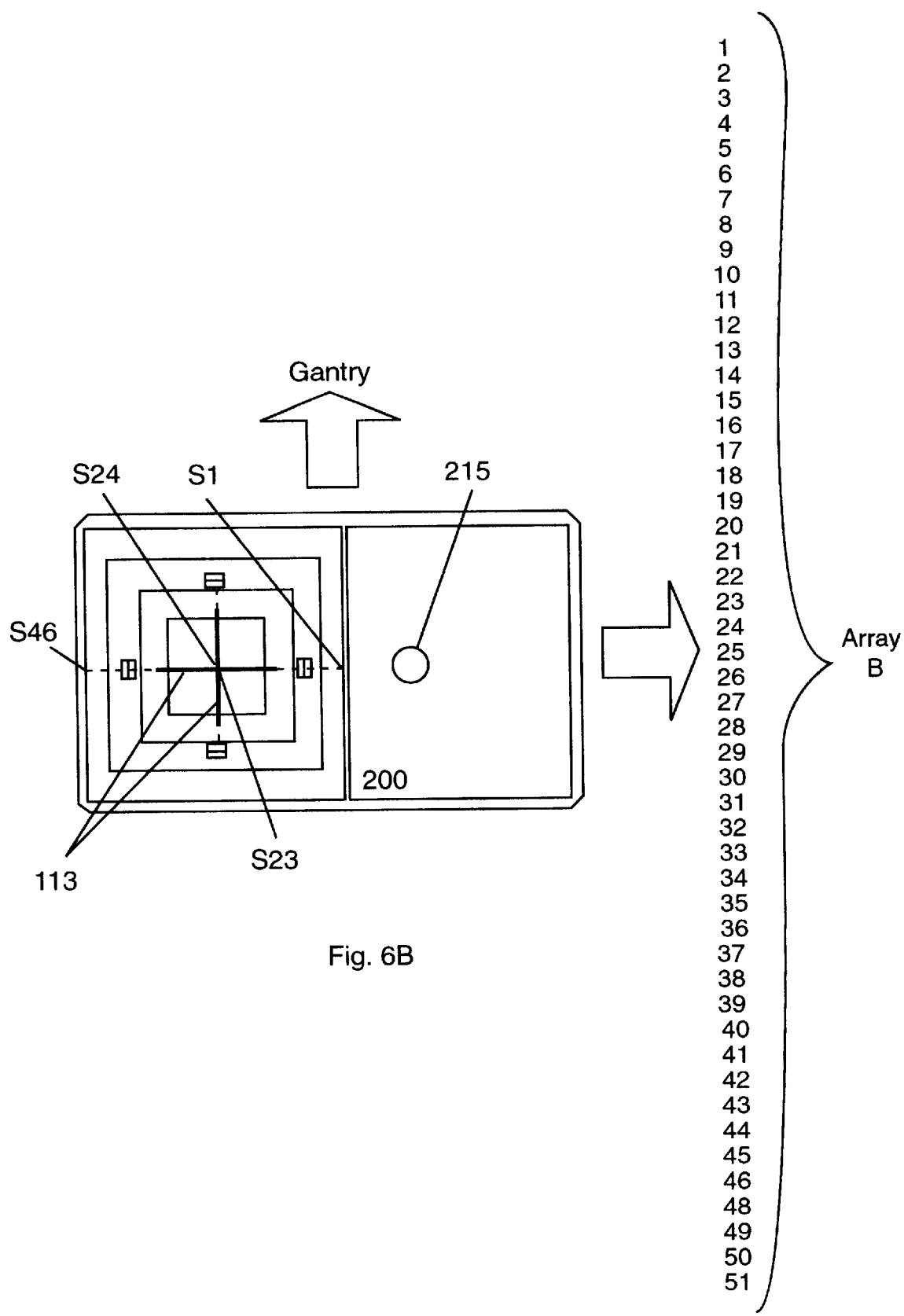
FIG. 6B shows the beam profiler of FIG. 6A, after leveling and beam warm up pulses, acquiring data from the detector array and saving the data into Array B.

Calibration Step 8 of FIG. 1, repeats the leveling process of Step 4. Step 9 of FIG. 1 has the beam turned for stabilization which is identical to Step 5 above, which was illustrated in FIG. 4. For Step 10 of FIG. 1, FIG. 6B shows the beam profiler of FIG. 6A, after leveling and beam warm-up pulses, acquiring data from the detector array and saving the data into Table B.

Steps 11, 12, and 13 are repeats of Step 7, FIG. 6A; Step 8, FIG. 3B; and Step 9, FIG. 4.

FIG. 7 represents Step 14 FIG. 1 where the beam profiler array 200 of FIG. 6B has been rotated again in the direction of arrow R1 another ninety degrees on surface 130, so that detector S46 is closest to Gantry support, G. Similar to the preceding steps, cross-hairs 113 is again aligned between diodes S23 and S24. Step 12 of FIG. 1, repeats the leveling process of both Steps 4 and 8 described above. Step 13 of FIG. 1 has the beam turned on to a stabilized level identical to preceding Steps 5 and 9 which was illustrated in FIG. 4. In FIG. 7, Table C represents acquiring data from detector array as stated in Step 14 of FIG. 1.

Step 15 of FIG. 1 specifies the detector array 200 of FIG. 8, be shifted in the direction of arrow SHIFT so that cross-hair 113 is aligned between S24 and S25. FIG. 8 shows the final data acquisition position of the detector array where it is shifted by one detector position away from the Gantry, support arm G. Next, Step 16 of FIG. 1 repeats the leveling process of Steps 4, 8 and 12.

Step 17 of FIG. 1 repeats the beam stabilization of preceding Steps 5, 9 and 13. Step 18 is the data acquisition where data is stored into Table D, shown in FIG. 8.

Table E represents raw data from Profiler, with 46 detectors in linear array and 4 off axis detectors 48 to 51.

TABLE E

| Detector | A | B | C | D |
| --- | --- | --- | --- | --- |
| 1 | 3415296 | 3407488 | 3389184 | 3359232 |
| 2 | 3553536 | 3552128 | 3538176 | 3517824 |
| 3 | 3533952 | 3531776 | 3520000 | 3515648 |
| 4 | 3098880 | 3093632 | 3075072 | 3069184 |
| 5 | 3639808 | 3633920 | 3616000 | 3603840 |
| 6 | 3368064 | 3358208 | 3341184 | 3329536 |
| 7 | 3681408 | 3672832 | 3658496 | 3646464 |
| 8 | 3515776 | 3504640 | 3488768 | 3475712 |
| 9 | 3125632 | 3114752 | 3101952 | 3091712 |
| 10 | 3584000 | 3568384 | 3554048 | 3546752 |
| 11 | 3547392 | 3533696 | 3520384 | 3512192 |
| 12 | 3428096 | 3412224 | 3400960 | 3394560 |
| 13 | 3051136 | 3032960 | 3026560 | 3019776 |
| 14 | 3353088 | 3328768 | 3322240 | 3312768 |
| 15 | 3503360 | 3477120 | 3473152 | 3464960 |
| 16 | 3314176 | 3291136 | 3293184 | 3285760 |
| 17 | 3038848 | 3019392 | 3027712 | 3024640 |
| 18 | 3316096 | 3287424 | 3299712 | 3305344 |
| 19 | 3551872 | 3517952 | 3531776 | 3545216 |
| 20 | 3478528 | 3444608 | 3447680 | 3455744 |
| 21 | 3465344 | 3436800 | 3435520 | 3432320 |
| 22 | 3201280 | 3180672 | 3179136 | 3179520 |
| 23 | 3430144 | 3412864 | 3404032 | 3414016 |
| 24 | 3154432 | 3138560 | 3108096 | 3110656 |
| 25 | 3398528 | 3381888 | 3349248 | 3329536 |
| 26 | 3387648 | 3372416 | 3340416 | 3320576 |
| 27 | 3496064 | 3481728 | 3444096 | 3430656 |
| 28 | 3591808 | 3580672 | 3531136 | 3518080 |
| 29 | 3408896 | 3400192 | 3344256 | 3321856 |
| 30 | 3612544 | 3603072 | 3547648 | 3522048 |
| 31 | 3484288 | 3474432 | 3433472 | 3414656 |
| 32 | 3813120 | 3803008 | 3764096 | 3748992 |
| 33 | 3558656 | 3549056 | 3513472 | 3504256 |
| 34 | 3452160 | 3439744 | 3401728 | 3397120 |
| 35 | 3290496 | 3279232 | 3243520 | 3238784 |
| 36 | 3623552 | 3611904 | 3570944 | 3564288 |
| 37 | 3848960 | 3838336 | 3789056 | 3781248 |
| 38 | 3636992 | 3624320 | 3578880 | 3572608 |
| 39 | 3145088 | 3135616 | 3099264 | 3093504 |
| 40 | 3491584 | 3481216 | 3440512 | 3435648 |
| 41 | 3436544 | 3424640 | 3381248 | 3379456 |
| 42 | 3429248 | 3418624 | 3381120 | 3377408 |
| 43 | 3794944 | 3779968 | 3734528 | 3733248 |
| 44 | 3520640 | 3509376 | 3467008 | 3464448 |
| 45 | 3081984 | 3077245 | 3029888 | 3024000 |

TABLE E-continued

| Detector | A | B | C | D |
|---|---|---|---|---|
| 46 | 3288576 | 3289088 | 3239424 | 3233408 |
| 48 | 3752448 | 3743104 | 3719680 | 3710976 |
| 49 | 3505920 | 3497344 | 3473920 | 3465088 |
| 50 | 3513984 | 3479808 | 3458560 | 3448576 |
| 51 | 3329664 | 3296512 | 3275648 | 3266048 |

Step 19 is calculating the intermediate array calibration factor (cf') using the equation in FIG. 9 and the C and D data sets. As previously discussed, the detector s shifted [D] and detector 2 moved to the position of detector 1.

The following numerical examples illustrate the calculations.

$cf'_1 = 1.000$ (All factors are relative to detector 1)

$cf'_2 = \dfrac{C_1}{D_2} = \dfrac{3389184}{3517824} = 0.9634$ $cf'_3 = \dfrac{C_1}{D_2} \cdot \dfrac{C_2}{D_3} = \dfrac{3389184}{3517824} \cdot \dfrac{3538176}{3515648} = 0.9696$ $cf'_4 = \dfrac{C_1}{D_2} \cdot \dfrac{C_2}{D_3} \cdot \dfrac{C_3}{D_4} = \dfrac{3389184}{3517824} \cdot \dfrac{3538176}{3515648} \cdot \dfrac{3520000}{3069184} = 1.1120$

↓

$cf'_{46} = \dfrac{C_1}{D_2} \cdots \dfrac{C_{44}}{D_{45}} \cdot \dfrac{C_{45}}{D_{46}} = \dfrac{3389184}{3517824} \cdots \dfrac{3467008}{3024000} \cdot \dfrac{3029888}{3233408} = 1.1519$ Note that it is not important that the calibration factors be normalized to detector 1, in fact, they can be normalized to any value because they are all relative to each other. Also note that the example can be simplified as a product series building upon the prior ratio result, such as:

$cf'_3 = cf'_2 \cdot \dfrac{C_2}{D_3} = 0.9634 \cdot \dfrac{3538176}{3515648} = 0.9696$ $cf'_4 = cf'_3 \cdot \dfrac{C_3}{D_4} = 0.9696 \cdot \dfrac{3520000}{3069184} = 1.1120$

↓

$cf'_{46} = cf'_{45} \cdot \dfrac{C_{45}}{D_{46}} = 1.2293 \cdot \dfrac{3029888}{3233408} = 1.1519$ However, care must be taken to not allow roundoff errors to accumulate in such a simplification.

Step 19 is referred to as intermediate because of a bias ($D_{dc}S_{dc}$) between measurements C and D, such as unequal radiation exposures during those measurements, or minor sensitivity differences as might be caused by temperature conditions of the detector array during those measurements. For example, assume that the total exposure for measurement C was 1% higher than that for measurement D. Then the ratio $C_1/D_2$ will not only contain the sensitivity ratio of detectors 1 and 2 at that position in the beam, but also the 1% difference in exposure. Thus, the calibration factor for detector 2, $C_1/D_2$, will be 1.01 times higher than the true factor. The error gets progressively worse for the higher detector numbers because each calculation accumulates the 1% error.

Step 20 calculates the bias values ($D_{dc}S_{dc}$) using the equation in FIG. 10 and the A, C and D data sets. As previously discussed, set C contains detector data where the detectors exchanged their positions by a 180 degree rotation from set A. Thus, there exists a set of detector pairs, mirrored through the center of rotation, which measure the same spatial location thus providing another solution of the relative sensitivity value between these detector pairs. The solution is independent of exposure differences and array sensitivity changes between measurements A and C. The solution for a selected detector pair by rotational substitution can then be used to calculate the bias in the same detector pair solution resulting from the translational substitution. This bias is then used to correct the intermediate cf' to the final calibration factors.

The following example calculates the bias from the detector pair 1 and 46, the end detectors in the array. For the Profiler, n can be any value from 24 to 46. In this example, n is 46.

$\ln(D_{dc} \cdot S_{dc})_{46} = \dfrac{1}{92 - (46+1)} \cdot \left[ \dfrac{1}{2}\ln\left(\dfrac{C_1}{C_{46}} \cdot \dfrac{A_1}{A_{46}}\right) - \sum_{i=1}^{45} \ln\dfrac{C_i}{D_{i+1}} \right]$ $\ln(D_{dc} \cdot S_{dc})_{46} = \dfrac{1}{45}\left[\dfrac{1}{2}\ln\left(\dfrac{3389184}{3239424} \cdot \dfrac{3415296}{3288576}\right) - \right.$ $\left. \ln\dfrac{3389184}{3517824} - \ln\dfrac{3538176}{3515648} - \cdots - \ln\dfrac{3029888}{3233408}\right]$ $\ln(D_{dc} \cdot S_{dc})_{46} = -0.002220$ $(D_{dc} \cdot S_{dc})_{46} = 0.997782$ The result $(D_{dc}S_{dc})_{46}=0.997782$ means that there was a difference between measurements C and D of 0.2218%. This difference could be due to an exposure difference or an array sensitivity shift. The other detector pairs can also be used to calculate this bias. Any individual pair bias can be used to correct the cf' values, likewise the average of all the pair biases can be used as defined in FIG. 11, or any combination of pair biases. Theoretically, they are all the same. Practically, they will not be numerically identical due to numerical resolution of the measurement system. For this data example, the result for $(D_{dc}S_{dc})_{45}=0.99869$, and $(D_{dc}S_{dc})_{44}=0.997735$.

Other systematic errors can also cause differences in the pair bias values, such as a failure to maintain uniform scattering conditions during the array movement or actual radiation beam shape differences between measurements A, C, and D. A comparison of the pair biases may provide some statement of the validity of the data, thus enabling a decision for keeping the calibration results.

Step 21 calculates the final calibration factors for the detector array using the equation in FIG. 11 and the results from steps 19 and 20.

The following example demonstrates the calculation, where for clarity, the value for $(D_{dc}S_{dc})_{46}=0.997782$ was used in the calculation instead of the average for all pairs as specified in FIG. 11.

$cf_1 = 1.000$ $cf_2 = 0.9634 \cdot e^{(2-1)\cdot(-0.002220)} = 0.9613$ $cf_3 = 0.9696 \cdot e^{(3-1)\cdot(-0.002220)} = 0.9653$ $cf_4 = 1.1120 \cdot e^{(4-1)\cdot(-0.002220)} = 1.1046$

↓

$cf_{46} = 1.1519 \cdot e^{(46-1)\cdot(-0.002220)} = 1.0424$

From this example, one can see that there was nearly a 10% correction to the intermediate calibration factor for detector 46. This is quite significant and is a good demonstration of the cumulative error behavior of the bias between sets C and D.

Further to this example, a spreadsheet calculation in Table F illustrates all the intermediate and final calibration factors as well as the application of these calibration factors to the data set C, resulting in the intermediate and final profile shape of the profile. Data set C was used because the subscripts align, however, sets A or D could also be converted to a profile if the subscripts are adjusted. In both cases, the profile "Set C*cf" and "SetC*cf '" were arbitrarily normalized to the detector 1 position.

TABLE F

| Detector | C | cf' | cf | Set C * cf' | Set C * cf |
|---|---|---|---|---|---|
| 1 | 3389184 | 1.0000 | 1.0000 | 1.000 | 1.000 |
| 2 | 3538176 | 0.9634 | 0.9613 | 1.006 | 1.004 |
| 3 | 3520000 | 0.9696 | 0.9653 | 1.007 | 1.003 |
| 4 | 3075072 | 1.1120 | 1.1046 | 1.009 | 1.002 |
| 5 | 3616000 | 0.9489 | 0.9405 | 1.012 | 1.003 |
| 6 | 3341184 | 1.0305 | 1.0191 | 1.016 | 1.005 |
| 7 | 3658496 | 09442 | 0.9317 | 1019 | 1.006 |
| 8 | 3488768 | 0.9939 | 0.9786 | 1.023 | 1.007 |
| 9 | 3101952 | 1.1215 | 1.1018 | 1.026 | 1.008 |
| 10 | 3554048 | 0.9809 | 0.9615 | 1.029 | 1.008 |
| 11 | 3520384 | 0.9926 | 0.9708 | 1.031 | 1.008 |
| 12 | 3400960 | 1.0294 | 1.0045 | 1.033 | 1.008 |
| 13 | 3026560 | 1.1593 | 1.1288 | 1.035 | 1.008 |
| 14 | 3322240 | 1.0591 | 1.0290 | 1.038 | 1.009 |
| 15 | 3473152 | 1.0155 | 0.9844 | 1.041 | 1.009 |
| 16 | 3293184 | 1.0734 | 1.0383 | 1.043 | 1.009 |
| 17 | 3027712 | 1.1687 | 1.1279 | 1.044 | 1.008 |
| 18 | 3299712 | 1.0706 | 1.0309 | 1.042 | 1.004 |
| 19 | 3531776 | 0.9964 | 0.9574 | 1.038 | 0.998 |
| 20 | 3447680 | 1.0183 | 0.9763 | 1.036 | 0.993 |
| 21 | 3435520 | 1.0229 | 0.9785 | 1.037 | 0.992 |
| 22 | 3179136 | 1.1053 | 1.0549 | 1.037 | 0.990 |
| 23 | 3404032 | 1.0292 | 0.9802 | 1.034 | 0.984 |
| 24 | 3108096 | 1.1263 | 1.0702 | 1.033 | 0.981 |
| 25 | 3349248 | 1.0514 | 0.9968 | 1.039 | 0.985 |
| 26 | 3340416 | 1.0605 | 1.0032 | 1.045 | 0.989 |
| 27 | 3444096 | 1.0326 | 0.9747 | 1.049 | 0.990 |
| 28 | 3531136 | 1.0109 | 0.9520 | 1.053 | 0.992 |
| 29 | 3344256 | 1.0745 | 1.0098 | 1.060 | 0.996 |
| 30 | 3547648 | 1.0203 | 0.9567 | 1.068 | 1.001 |
| 31 | 3433472 | 1.0600 | 0.9917 | 1.074 | 1.005 |
| 32 | 3764096 | 0.9708 | 0.9062 | 1.078 | 1.006 |
| 33 | 3513472 | 1.0428 | 0.9713 | 1.081 | 1.007 |
| 34 | 3401728 | 1.0785 | 1.0023 | 1.083 | 1.006 |
| 35 | 3243520 | 1.1328 | 1.0504 | 1.084 | 1.005 |
| 36 | 3570944 | 1.0308 | 0.9538 | 1.086 | 1.005 |
| 37 | 3789056 | 0.9735 | 0.8987 | 1.088 | 1.005 |
| 38 | 3578880 | 1.0325 | 0.9511 | 1.090 | 1.004 |
| 39 | 3099264 | 1.1945 | 1.0978 | 1.092 | 1.004 |
| 40 | 3440512 | 1.0775 | 0.9882 | 1.094 | 1.003 |
| 41 | 3381248 | 1.0970 | 1.0038 | 1.094 | 1.001 |
| 42 | 3381120 | 1.0982 | 1.0027 | 1.096 | 1.000 |
| 43 | 3734528 | 0.9947 | 0.9061 | 1.096 | 0.998 |
| 44 | 3467008 | 1.0722 | 0.9746 | 1.097 | 0.997 |
| 45 | 3029888 | 1.2293 | 1.1149 | 1.099 | 0.997 |
| 46 | 3239424 | 1.1519 | 1.0424 | 1.101 | 0.996 |

Figure 12:
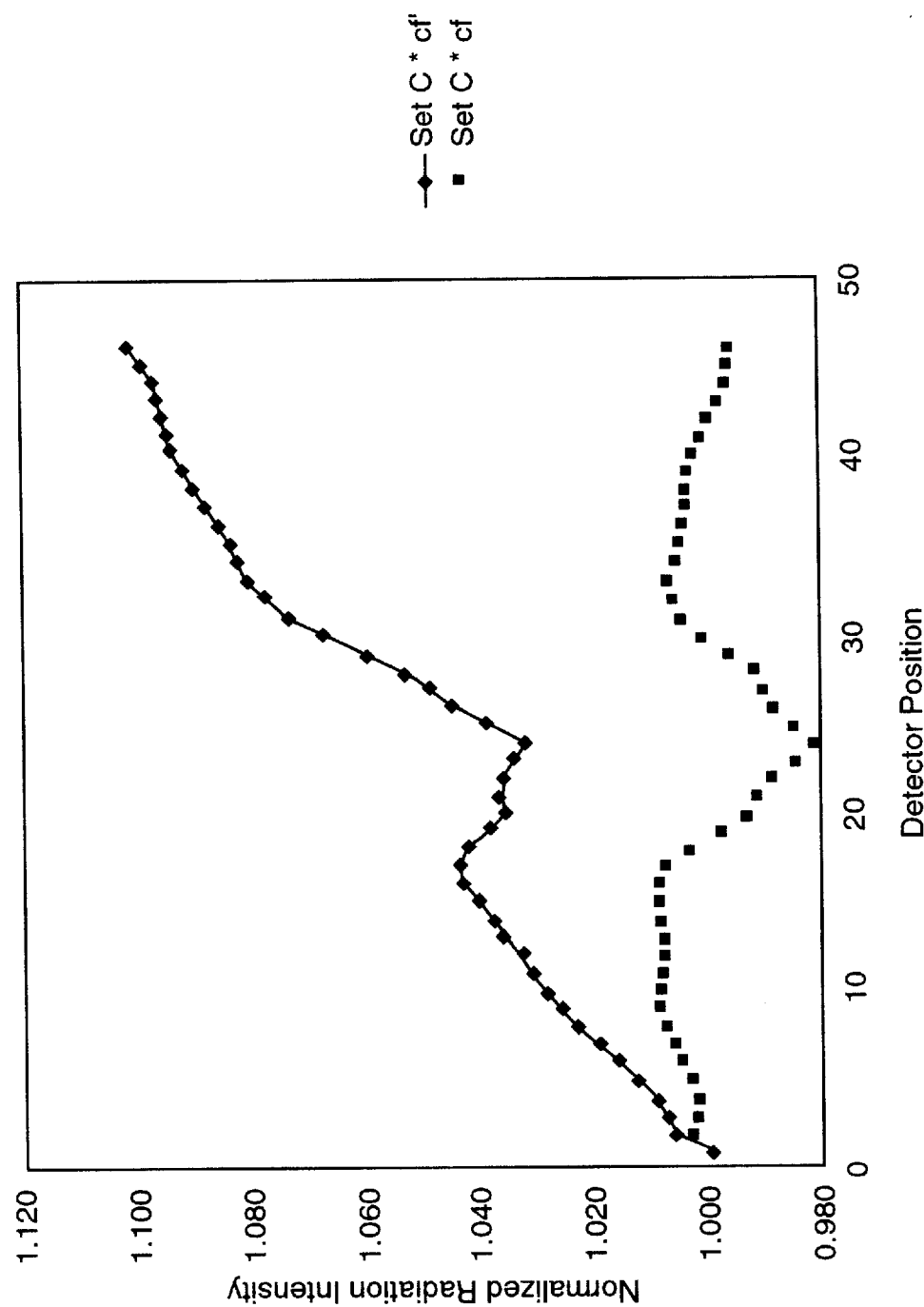
FIG. 12 is a graph of the normalized radiation intensity versus detector position.

FIG. 12 graphically illustrates the profiles calculated with the intermediate and final calibration factors. The radiation profile generated from the linear accelerator is symmetrical around its center and flat to within 3%. From FIG. 12, it is clear that the graph using the final calibration factors cf satisfies this shape and that the intermediate profile is clearly biased up as the detector number increases. It can then be concluded that the calibration is successful.

From this example, one can see that the calibration steps also result in a measurement of the radiation intensity profile. Under these conditions, this profile measurement is nearly ideal because it is made under the exact conditions of the calibration. In other words, a profile measurement procedure can be established, using the concepts described in this embodiment, which results in an automatic calibration and measurement of the beam, with no prior knowledge of detector sensitivity. These concepts can be extended to off axis measurements, measurements at various depths, measurements in predefined scattering conditions, and measurements along any axis. Although, the preferred embodiment describes using the Sun Nuclear Profiler array detector, model 1170, which uses a linear array, the invention can be applicable to accommodate other array geometries of detector arrays by various manufacturers.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of calibrating a linear detector array's response with respect to a single detector within the array, in a radiation field which covers the array detectors to be calibrated, by comprising the steps of:

a) recording the response of the detectors to the radiation field;

b) translating the array by one detector spacing such that detectors occupy spatial positions formerly occupied by their neighbors and recording the response of the detectors to the radiation field;

c) calculating the intermediate detector calibration factors, via a product series of neighbor response ratios with data from steps (a) and (b), which includes a propagated bias between the response recordings in steps (a) and (b); and d) applying a bias correction to the intermediate calibration factors found in step (c), resulting in a calibration of the array.

2. The method of claim 1 wherein steps (a) and (b) include:
   simultaneous recording of the response of the detectors.

3. The method of claim 1 wherein steps (a) and (b) include:
   multiplexed recording of the response of the detectors.

4. The method of claim 1, wherein step (d) includes:
   calculating the bias correction by requiring that the relative radiation field intensity measured from at least two more points in at least one of the steps (a) and (b) and corrected with intermediate factors from step (c) be equal to the relative radiation field intensity at identical points as measured by prior independent means.

5. The method of claim 4 wherein the two field points in step (d) coincide with end detectors in the array.

6. The method of claim 1, wherein step (d) includes:
   calculating the bias correction by measuring with independent means, one of a dose and sensitivity bias between the response recordings in steps (a) and (b).

7. The method of claim 1, wherein step (d) includes:
   recording the response of at least two detectors independently at an identical field position, calculating the calibration factors of the identical detectors from independent measurements, then calculating the bias correction by requiring that the calibration factors for detectors from the independent measurements be equal to the intermediate calibration factors from step 1(c) for corresponding detectors.

8. The method of claim 7, wherein the two detectors in step (d) are end detectors in the array.

9. The method of claim 1, wherein step (d) includes:

rotating the array 180 degrees such that detector positions are exchanged, recording the response of the detectors to the radiation field, calculating with data from steps 1(b) and 9(d) mirror calibration factors of detectors whose positions were exchanged by rotation, calculating with data from steps 1(a) and 1(b) the intermediate mirror calibration factors of detectors whose positions were exchanged in steps 1(b) and 9(d), then calculating the bias correction by requiring the intermediate mirror calibration factors of two or more of the detectors be equal to their mirror calibration factors.

10. A method of calibrating a linear detector array's response with respect to a single detector within the array, in a radiation field which covers the array detectors to be calibrated, by comprising the steps of:

a) recording the response of the detectors to the radiation field;

b) rotating the array 180 degrees such that detector positions are exchanged and recording the response of the detectors to the radiation field;

c) translating the array by one detector spacing such that detectors occupy the spatial position formerly occupied by their neighbors and recording the response of the detectors to the radiation field;

d) calculating with data from steps (a) and (b) mirror calibration factors of detectors whose positions were exchanged by rotation;

e) calculating intermediate detector calibration factors, via a product series of neighbor response ratios with data from steps (b) and (c), which includes a propagated bias between the response recordings in (b) and (c);

f) calculating with data from steps (b) and (c) intermediate mirror calibration factors of detectors whose positions were exchanged in steps (a) and (b); and g) calculating bias correction by requiring the intermediate mirror calibration factors found in step (f) of at least two of the detectors be equal to their mirror calibration factors found in step (d) and then applying the bias correction to the intermediate calibration factors found in step (e), resulting in calibration of the array.

11. A method of calibrating a two dimensional detector array's response with respect to a single detector within the array, in a radiation field which covers the array detectors to be calibrated, when said two dimensional array is comprised of a linear array and at least one radial array whose detector positions are substituted by rotation of the array with detectors in the linear array, by comprising the steps of:

a) recording the response of the detectors to the radiation field;

b) rotating the array such that the radial detector positions in step (a) are occupied by linear array detectors, recording the response of the linear array detectors to the radiation field, and repeating step 11(b) until each radial array position has been occupied at least once by at least one linear array detector;

c) rotating the array a net 180 degrees from the position in step (a) such that linear array detector positions are exchanged and recording the response of the exchanged linear array detectors to the radiation field;

d) translating the array by one linear array detector spacing such that detectors in the translated array occupy the spatial position formerly occupied by their neighbors and recording the response of the detectors to the radiation field;

e) calculating with data from steps (a) and (c) mirror calibration factors of the linear array detectors whose positions were exchanged by rotation;

f) calculating intermediate linear array detector calibration factors, via a product series of neighbor response ratios with data from steps (c) and (d), which includes a propagated bias between the response recordings in steps (c) and (d);

g) calculating with data from steps (c) and (d) intermediate mirror calibration factors of linear array detectors whose positions were exchanged in steps (a) and (c);

h) calculating bias correction by requiring the intermediate mirror calibration of at least two of the linear array detectors found in step (g) be equal to their mirror calibration factors found in step (e) and then applying the bias correction to the intermediate calibration factors found in step (f), resulting in the linear array calibration; and i) calculating calibration factors of the radial arrays from the calibration factors, found in step (h), of detectors in the linear array which substituted the radial array detectors and the response data in one of steps (a) and (b), and steps (b) and (c).

12. The method of claim 11, wherein a radial array includes:

at least one detector on a line orthogonal to the linear array, and the radial array detector positions of step (a) are substituted with linear array detectors in a 90 degree array rotation in step (b).

13. The method of claim 12, further comprising additional detectors off the linear array that form columns parallel to the linear array with a member of each column belonging to a radial array of claim 12 and with the detector positions in the parallel columns being substituted in the translation of step 11(d), and calculating the parallel column detector calibration factors, via a product series of neighbor response ratios with data from steps 11(c) and (d), including the bias correction calculated in step 11(h) and the parallel column's radial array detector calibration factor calculated in step 11(i).

14. The method of claim 13 wherein steps (a), (b), (c), and (d): include simultaneous recording of the response of the detectors.

15. The method of claim 13 wherein steps (a), (b), (c), and (d):

include multiplexed recording of the response of the detectors.

16. A method of calibrating a two dimensional detector array's response with respect to a single detector within the array, in a radiation field which covers the array detectors to be calibrated, when said two dimensional array is comprised of one or more linear arrays, comprising the steps of:

a) recording the response of the detectors to the radiation field;

b) moving the array such that detectors in one linear array occupy positions formerly occupied by detectors from another linear array and recording the response of the detectors to the radiation field, and repeating step 14(d) until at least one detector positions from each linear array have been occupied by at least one detector from additional linear arrays;

c) rotating the array a net 180 degrees from the position in step (a) such that linear array detector positions are exchanged and recording the response of the detectors to the radiation field, and repeating step 14(*b*) until each linear array position has been rotated;

d) translating a linear array by one linear array detector spacing such that detectors in the linear array occupy spatial positions formerly occupied in step 14(*c*) by their neighbors in the linear array and recording the response of the detectors to the radiation field, and repeating step 14(*c*) until each linear array has been translated;

e) calculating with data from steps (a) and (c) mirror calibration factors of the detectors in the linear arrays whose positions were exchanged by rotation;

f) calculating intermediate detector calibration factors in the linear arrays, via a product series of neighbor response ratios with data from steps (c) and (d), which includes propagated biases between the response recordings in (c) and (d);

g) calculating with data from steps (c) and (d) intermediate mirror calibration factors of detectors in the linear arrays whose positions were exchanged in steps (a) and (c); and h) calculating bias corrections by requiring the intermediate mirror calibration factors of at least two of the detectors in the linear arrays found in step (g) be equal to their mirror calibration factors found in step (e) and then applying the bias correction to the intermediate calibration factors found in step (f), resulting in the calibration of each linear array; and i) calculating two dimensional radial array calibration factors from the calibration factors found in step (h) of detectors in the linear array which substituted the detector positions in other linear arrays in step (b) and the response data in one of: steps (a) and (b) and steps (b) and (c).

* * * * *